United States Patent
Jaafar et al.

(10) Patent No.: US 10,380,803 B1
(45) Date of Patent: Aug. 13, 2019

(54) METHODS AND SYSTEMS FOR VIRTUALIZING A TARGET OBJECT WITHIN A MIXED REALITY PRESENTATION

(71) Applicant: Verizon Patent and Licensing Inc., Arlington, VA (US)

(72) Inventors: Ali Jaafar, Guttenburg, NJ (US); Jaskirat Singh Randhawa, Brooklyn, NY (US); Abdul Mahmood, Union, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/936,339

(22) Filed: Mar. 26, 2018

(51) Int. Cl.
*G06T 19/00* (2011.01)

(52) U.S. Cl.
CPC ............................. *G06T 19/006* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,384,819 B1* | 5/2002 | Hunter | ............... | G06K 9/00335 345/418 |
| 7,733,343 B2* | 6/2010 | May | ........................ | G06T 15/60 345/418 |
| 9,754,416 B2* | 9/2017 | Kamhi | ............... | G06K 9/00671 |
| 2003/0034974 A1* | 2/2003 | Welch | ..................... | G06T 13/20 345/426 |
| 2004/0239670 A1* | 12/2004 | Marks | ..................... | A63F 13/10 345/419 |
| 2010/0302257 A1* | 12/2010 | Perez | ..................... | G06T 7/251 345/474 |
| 2011/0292055 A1* | 12/2011 | Hodgins | ................. | G06T 13/40 345/473 |
| 2012/0306924 A1* | 12/2012 | Willoughby | ............ | A63F 13/10 345/641 |

(Continued)

OTHER PUBLICATIONS

Boyajian, et al., Loup Ventures, "Don't Miss the Importance of Diminished Reality," http://loupventures.com/dont-miss-the-importance-of-diminished-reality/, Apr. 12, 2017.

*Primary Examiner* — Motilewa Good Johnson

(57) ABSTRACT

An exemplary mixed reality presentation system accesses video data representative of a real-world environment proximate to a mixed reality player device that is configured to present, to a user of the mixed reality player device, a mixed reality presentation. In the mixed reality presentation, one or more virtual objects included within a virtual domain associated with the real-world environment are presented together with real objects included within the real-world environment. The mixed reality presentation system identifies, based on the accessed video data, a target object among the real objects included within the real-world environment. The mixed reality presentation system extracts the target object from the mixed reality presentation and replaces, within the mixed reality presentation, the target object with a virtual object included within the virtual domain. The virtual object implements a representation of the target object. Corresponding methods are also disclosed.

20 Claims, 14 Drawing Sheets

(56) References Cited

U.S. PATENT DOCUMENTS

| | | | |
|---|---|---|---|
| 2012/0307010 A1* | 12/2012 | Evertt | H04N 5/2226 348/46 |
| 2013/0083173 A1* | 4/2013 | Geisner | G06F 3/013 348/51 |
| 2014/0035901 A1* | 2/2014 | Chen | G06T 13/40 345/419 |
| 2014/0078144 A1* | 3/2014 | Berriman | A63F 13/10 345/426 |
| 2014/0285513 A1* | 9/2014 | Aguado | G06T 13/40 345/620 |
| 2015/0097862 A1* | 4/2015 | Reisner-Kollmann | G06T 19/006 345/633 |
| 2015/0130790 A1* | 5/2015 | Vasquez, II | G06T 19/006 345/419 |
| 2015/0279113 A1* | 10/2015 | Knorr | G06T 19/006 345/633 |
| 2017/0017830 A1* | 1/2017 | Hanai | G06F 3/048 |
| 2017/0337741 A1* | 11/2017 | Fradet | G06T 17/10 |

\* cited by examiner

METHODS AND SYSTEMS FOR VIRTUALIZING A TARGET OBJECT WITHIN A MIXED REALITY PRESENTATION

BACKGROUND INFORMATION

Computing and communication technologies are being employed to provide sophisticated presentations of various types of reality to users of the technologies. The various types of reality being presented to users may be placed at different points on a virtuality continuum extending from completely real environments at one extreme, to completely virtual environments at an opposite extreme.

Any type of reality between the extremes of completely real and completely virtual may be referred to as "mixed reality." As such, mixed reality presentations may include visual and/or audible representations of both real and virtual elements that are presented together. There are technical limitations and challenges in producing conventional mixed reality presentations, particularly in how virtual elements are presented together with real elements in the mixed reality presentations.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
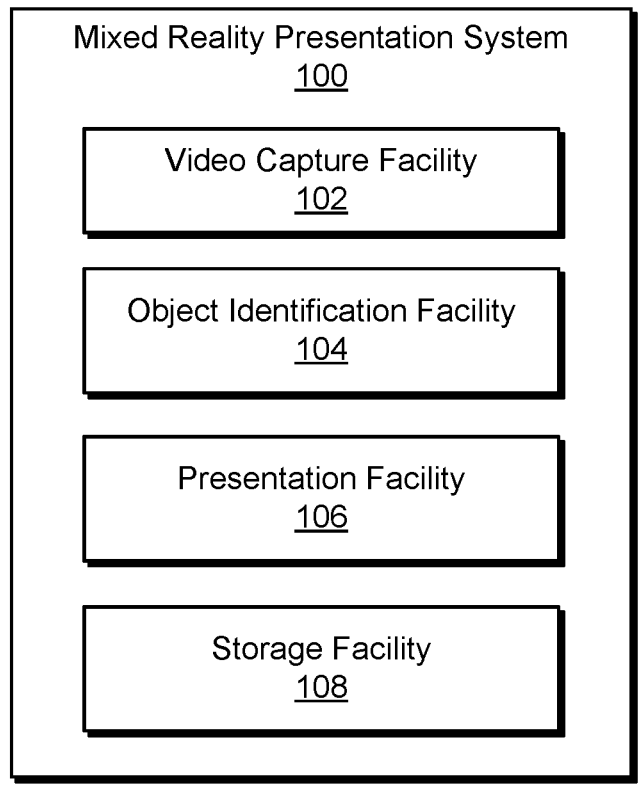
FIG. 1 illustrates an exemplary mixed reality presentation system for virtualizing a target object within a mixed reality presentation according to principles described herein.

Systems and methods for virtualizing a target object within a mixed reality presentation are described herein. Specifically, as used herein, a target object (e.g., an object located within a real-world environment) may be "virtualized" within a mixed reality presentation when a virtual representation of the target object (e.g., a two-dimensional ("2D") or three-dimensional ("3D") model of the target object) is substituted for the target object within the mixed reality presentation such that the target object appears to still be present within the real-world environment, but may be made to appear to behave in a different manner within the mixed reality presentation than the target object is behaving in reality. For example, as will be described in more detail below, a target object associated with a character (e.g., a toy, an image of a character statically displayed on an object or animated on a screen, etc.) may be virtualized so as to appear to "come to life" within the mixed reality presentation.

Target objects may be virtualized within mixed reality presentations in any manner described herein or as may serve a particular implementation. For instance, an exemplary mixed reality presentation system may access video data representative of a real-world environment proximate to a mixed reality player device (e.g., a real-world environment near the mixed reality player device that is visible to a camera of the mixed reality player device, a real-world environment surrounding the mixed reality player device and/or within which the mixed reality player device is disposed, etc.). The mixed reality player device may be configured to present a mixed reality presentation to a user of the mixed reality player device. The mixed reality presentation may involve one or more virtual objects included within a virtual domain associated with the real-world environment being presented together with real objects included within the real-world environment.

Based on the accessed video data, the mixed reality presentation system may identify a target object among the real objects included within the real-world environment. Upon identifying the target object, the mixed reality presentation system may continue the process of virtualizing the target object for the mixed reality presentation by extracting and replacing the target object within the mixed reality presentation. For example, the mixed reality presentation system may extract the target object (i.e., the representation of the target object) from the mixed reality presentation by overlaying a first virtual object included within the virtual domain onto the mixed reality presentation in alignment with the target object. The first virtual object may implement an extraction object, as will be described in more detail below. The mixed reality presentation system may then replace the extracted target object within the mixed reality presentation by overlaying a second virtual object included within the virtual domain onto the mixed reality presentation out of alignment with the target object. The second virtual object may implement a representation (e.g., an animated 3D model or the like) of the target object.

Because the first virtual object (e.g., the extraction object) is overlaid to be in alignment with the target object while the second virtual object (e.g., the representation of the target object) is overlaid to be out of alignment with the target object, it may appear to a user viewing the mixed reality presentation that the target object itself moves, over a period of time, from a first location coincident with the actual location of the target object to a different location in the real-world environment. As the target object appears to move in this way (i.e., as the second virtual object moves), the actual location of the target object may appear to be vacant as a result of the first virtual object. For example, the first virtual object (e.g., the extraction object) may fill in the gaps of whatever is behind the target object to make it look as if the target object has disappeared, or, more precisely, has been replaced by the representation of the target object (i.e., the second virtual object) that is behaving (e.g., moving) in a different manner than the target object.

The target object that is virtualized by the mixed reality presentation system may be any suitable inanimate object such as a piece of furniture, a household item, or the like. In certain examples, as mentioned above, the target object may be an object that emulates a character, such as a model of a character (e.g., a figurine, an action figure, a stuffed animal, etc.), a picture or other representation of a character (e.g., a drawing, a T-shirt, a magazine, a screen presenting a video screen, etc.), or the like. As used herein, a "character" may refer to a person, animal, or object that has, or may (within a mixed reality presentation) be imbued with, lifelike qualities such as movement, personality, artificial intelligence, or the like. As will be described in more detail below, characters may be made to come to life or to otherwise behave differently than target objects emulating the characters within the mixed reality presentation as a result of the virtualization described herein. In some examples, characters may be made to appear to encounter, recognize, and/or interact with other target objects (e.g., other character-emulating objects, other types of non-character-emulating objects, etc.) within the mixed reality presentation.

For instance, in certain exemplary implementations, the mixed reality presentation system may access the video data representative of the real-world environment proximate to the mixed reality player device and identify, based on the accessed video data, a target object that emulates a character. The mixed reality presentation system may extract this character-emulating target object from the mixed reality presentation and generate an animated 3D model of the character associated with the target object. The mixed reality presentation system may integrate the animated 3D model of the character into the virtual domain to be presented within the mixed reality presentation (e.g., thereby making the character appear to behave differently than the character-emulating target object behaves in reality).

While the animated 3D model is being presented within the mixed reality presentation, the mixed reality presentation system may identify an additional target object among the real objects included within the real-world environment. Specifically, the mixed reality presentation may identify the additional target object while the additional target object is included within a field of view of the animated 3D model of the character (e.g., to simulate the character encountering, noticing, and/or recognizing the additional target object). Having identified the additional target object in this way, the mixed reality presentation system may extract the additional target object from the mixed reality presentation by overlaying a third virtual object included within the virtual domain onto the mixed reality presentation in alignment with the additional target object, and may replace the additional target object within the mixed reality presentation by overlaying a fourth virtual object included within the virtual domain onto the mixed reality presentation out of alignment with the additional target object. The third virtual object may be an extraction object for the additional target object and the fourth virtual object may be a representation (e.g., a 3D model) of the additional target object. The mixed reality presentation system may then present, within the mixed reality presentation, an interaction between the animated 3D model of the character and the fourth virtual object, which interaction may differ from how the target object and the additional target object behave in reality.

Methods and systems described herein for virtualizing a target object within a mixed reality presentation may provide various benefits and/or advantages over conventional mixed reality technology. For example, methods and systems disclosed herein may help present virtual elements within a mixed reality presentation in a way that, in contrast with conventional mixed reality technologies, does not distract from, overshadow, and/or overwhelm real elements in the mixed reality presentation. Specifically, while conventional technologies may be limited to overlaying virtual elements atop real elements in a manner that risks making the mixed reality presentation overly virtual and/or not sufficiently grounded in reality, methods and systems disclosed herein may virtualize objects that in fact exist in the real-world environment. By virtualizing objects in this way rather than adding or overlaying virtual objects that do not in fact exist in the real-world environment, methods and systems described herein may blur the line between reality and virtual reality in a new and/or improved way that may allow users to enjoy virtual elements while remaining grounded and immersed in the real world with the real objects actually existing therein.

As will be described in more detail below, and by way of various techniques described herein, disclosed methods and systems may simulate lighting effects caused by virtualized objects, may account for occlusion changes caused by virtualized objects, and/or may perform other such operations to make the mixed reality presentation accurate, attractive, and immersive for the user. Additionally, as will be described below, techniques for determining which target objects to virtualize at which particular times may be employed to provide performance benefits. For example, by virtualizing only select target objects at specific times in accordance with the principles described herein, systems for virtualizing a target object within a mixed reality presentation conserve finite computing resources for other operations and thereby improve the performance of the systems.

Various embodiments will now be described in more detail with reference to the figures. The disclosed systems and methods may provide one or more of the benefits mentioned above and/or various additional and/or alternative benefits that will be made apparent herein.

FIG. 1 illustrates an exemplary mixed reality presentation system 100 for virtualizing a target object within a mixed reality presentation. As shown, system 100 may include, without limitation, a video capture facility 102, an object identification facility 104, a presentation facility 106, and a storage facility 108 selectively and communicatively coupled to one another. It will be recognized that although facilities 102 through 108 are shown to be separate facilities in FIG. 1, facilities 102 through 108 may be combined into fewer facilities, such as into a single facility, or divided into more facilities as may serve a particular implementation.

In some examples, system 100 may be closely related to a mixed reality player device (e.g., a dedicated mixed reality device, a general purpose mobile device, etc.) associated with (e.g., being used by) a user who is experiencing a mixed reality presentation presented by the mixed reality player device. For example, system 100 may be partially or entirely implemented by the mixed reality player device, or system 100 may include the mixed reality player device, which may partially or fully implement one or more of facilities 102 through 108. Exemplary configurations of system 100 with respect to the mixed reality player device will be described below, and each of facilities 102 through 108 will now be described in more detail.

Video capture facility 102 may include one or more physical computing components (e.g., hardware and/or software components such as a processor, a memory, a communication interface, instructions stored on the memory for execution by the processor, etc.) and/or other components (e.g., one or more cameras or other video capture devices) that are configured to access video data representative of a real-world environment proximate to the mixed reality player device. For example, the mixed reality player device may be proximate to the real-world environment by being included within (e.g., surrounded by) the real-world environment, by being within a line of sight of the real-world environment, or in another suitable way as may serve a particular implementation.

The mixed reality player device proximate to the real-world environment may include a capture device (e.g., a video camera) configured to capture video data representative of the real-world environment. As such, if video capture facility 102 is implemented within the mixed reality player device, video capture facility 102 may incorporate the capture device and may access the video data by using the incorporated capture device to capture the video data. In other examples in which video capture facility 102 is not implemented within the mixed reality player device, video capture facility 102 may access the video data captured by the capture device in another suitable way (e.g., by requesting and receiving the video data from the capture device and/or from the mixed reality player device).

Object identification facility 104 may similarly include one or more physical computing components (e.g., hardware and/or software components separate from those of video capture facility 102 or shared with video capture facility 102) configured to identify target objects within the real-world environment. More particularly, object identification facility 104 may be configured to identify a target object among the real objects included within the real-world environment based on video data accessed (e.g., captured) by video capture facility 102. As will be described in more detail below, target objects may be identified in various different ways, some of which may involve processing and/or storage capacity that is not available on the mixed reality player device but, rather, is accessed by way of communication with a separate device or system (e.g., an external system such as a cloud system associated with a mixed reality provider or the like). As such, object identification facility 104 may be fully implemented on the mixed reality player device, fully implemented on a separate system or device, or distributed across both the mixed reality player device and one or more other systems or devices that facilitate the identification of target objects in the accessed video data.

Presentation facility 106 may include video components (e.g., a display screen, a projector, an interface for communicating video data to another display screen, etc.), audio components (e.g., a loudspeaker, an earphone jack, an interface for wirelessly communicating sound data to another speaker or headset, etc.), and one or more physical computing components (e.g., hardware and/or software components separate from or shared with those of facilities 102 and/or 104) configured to present the mixed reality presentation to the user. For example, presentation facility 106 may be at least partially implemented on the mixed reality player device and may generate and present (e.g., using audio/visual components of the mixed reality player device) the mixed reality presentation based on the accessed video data and based on one or more virtual objects included within a virtual domain that is associated with the real-world environment. Specifically, presentation facility 106 may present aspects of the real-world environment as they are in reality (e.g., using the accessed video data, using a partially transparent display, etc.) together with aspects of the virtual domain associated with the real-world environment (e.g., virtual objects, etc., as will be described in more detail below).

In certain examples, presentation facility 106 may extract a target object identified by object identification facility 104 from the mixed reality presentation. For example, as will be described and illustrated below, presentation facility 106 may not display the target object within the mixed reality presentation but, rather, may overlay a first virtual object implementing an extraction object (e.g., an extrapolation of what is occluded by the target object in the real-world environment) onto the mixed reality presentation in alignment with (e.g., directly over or in place of) the target object such that the target object seems to disappear. Additionally, presentation facility 106 may replace the target object within the mixed reality presentation by overlaying a second virtual object included within the virtual domain onto the mixed reality presentation out of alignment with (e.g., separate from or at least not completely covering) the target object. The second virtual object may implement a representation of the target object such that that target object may not seem to disappear after all, but rather to behave in a different manner than the target object is actually behaving in the real-world environment. As mentioned above, identifying, extracting, and replacing a target object in this way may be referred to herein as virtualizing the target object within the mixed reality presentation.

Local storage facility 108 may maintain any suitable data representative of one or more target objects (e.g., known target objects that may be identified), other real objects that are not necessarily target objects (e.g., objects that may be occluded by target objects and for which data may be extrapolated in order to form extraction objects), virtual objects that may replace target objects (e.g., 3D models of the target objects, etc.), and/or any other data received, generated, managed, maintained, used, and/or transmitted by facilities 102 through 106 to perform the operations described herein.

Figure 2:
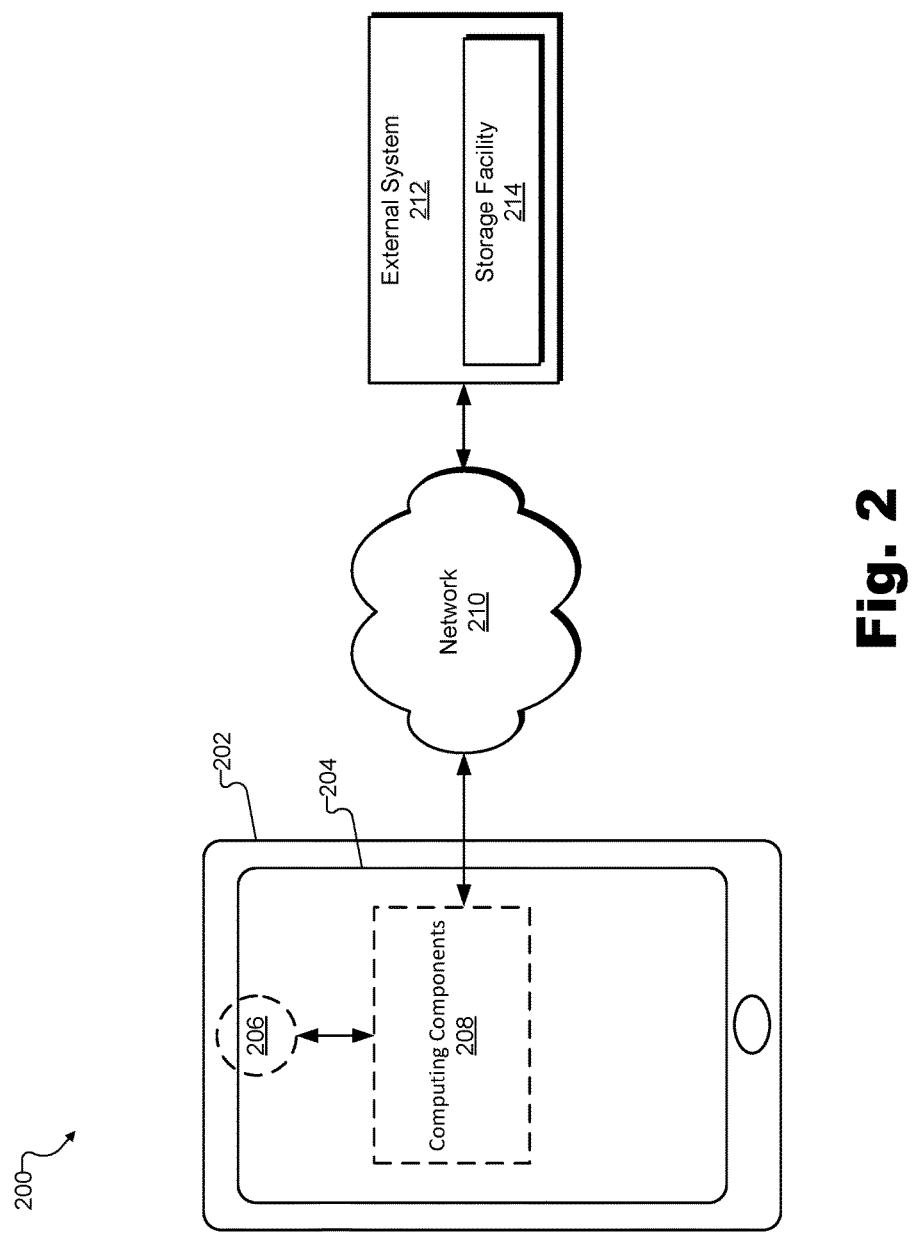
FIG. 2 illustrates an exemplary implementation of the mixed reality presentation system of FIG. 1 according to principles described herein.

FIG. 2 illustrates an exemplary implementation 200 of system 100. As shown, implementation 200 includes a mixed reality player device 202 that includes a display screen 204, a capture device 206, and computing components 208. In some examples, capture device 206 may be disposed on the backside of mixed reality player device 202

(i.e., the opposite side as screen 204) while computing components 208 may be disposed inside an enclosure of mixed reality player device 202.

In certain examples, system 100 may be completely implemented by mixed reality player device 202. For example, video capture facility 102 may be implemented by capture device 206 and computing components 208, object identification facility 104 and storage facility 108 may be implemented by computing components 208, and presentation facility 108 may be implemented by computing components 208 and display screen 204. Other suitable components not explicitly represented in FIG. 2 may also be used within an implementation of system 100 that is entirely implemented by mixed reality player device 202.

Mixed reality player device 202 and the components included therein (e.g., screen 204, capture device 206, computing components 208, etc.) may be implemented in any device or form factor as may serve a particular implementation. For example, as shown in FIG. 2, mixed reality player device 202 may be implemented within a general purpose mobile device such as a smartphone, tablet computer, or the like. Additionally or alternatively, mixed reality player device 202 may be implemented as a dedicated mixed reality device (e.g., a dedicated augmented reality device), or the like. For instance, in some implementations, mixed reality player device 202 may be implemented by or may include a head-mountable device configured to present the mixed reality presentation while being worn on the head of the user. In these examples, screen 204 may be implemented as two separate screens (e.g., one associated with each eye of the user) or in any other manner as may serve a particular implementation.

The exemplary implementation of mixed reality player device 202 illustrated in FIG. 2 illustrates a screen 204 that is completely opaque and that may be used to present video content (e.g., content represented by video data captured in real time by capture device 206). However, as mentioned above, in certain implementations, screen 204 may be implemented as a partially and selectively transparent screen that may allow light from the real-world environment to pass through certain sections of the screen while displaying virtual elements (e.g., virtual objects included within the virtual domain) on other sections of the screen. Regardless of how mixed reality player device works, it will be understood that the mixed reality presentation principles described herein are equally applicable. That is, mixed reality player device 202 may present real world objects from the real-world environment (e.g., using video data or partial transparency of the screen) along with virtual objects included within the virtual domain associated with the real-world environment. Examples of such mixed reality presentations will be described and illustrated in more detail below.

While system 100 may be completely integrated within mixed reality player device 202 in certain examples, in other examples, certain operations performed by system 100 may be at least partially offloaded to other systems and/or devices. For example, a camera separate from mixed reality player device 202 may be used in certain examples to capture video data accessed by system 100. Additionally, as illustrated in FIG. 2, processing and/or storage capacity of external devices and/or systems from mixed reality player device 202 may also be used to perform certain operations of system 100. Specifically, as shown, a network 210 may attach mixed reality player device 202 to an external system 212 that may include a storage facility 214.

Network 210 may include any provider-specific network (e.g., a cable, satellite, or mobile phone carrier network, or the like), the Internet, any wide area network, or any other suitable network. As such, data may flow between mixed reality player device 202 (e.g., computing components 208 of mixed reality player device 202) and external system 212 by way of network 210 using any suitable communication technologies, devices, media, and protocols as may serve a particular implementation. While only one network 210 is shown to interconnect mixed reality player device 202 and external system 212 in implementation 200, it will be recognized that network 210 may represent various interconnected networks and/or subnetworks, and that devices and systems connected to network 210 may communicate with one another by way of multiple interconnected networks as may serve a particular implementation.

External system 212 may include any external computer system as may serve a particular implementation. For instance, external system 212 may represent one or more server computers associated with a provider of mixed reality services and/or experiences. As another example, external system 212 may represent a local computer system (e.g., on a same local area network as mixed reality player device 202) that has been setup (e.g., by the user) to facilitate various operations being performed by mixed reality player device 202. As one specific example that will be described in more detail below, external system 212 may perform or otherwise facilitate object recognition operations performed by system 100. For example, because such operations may require a relatively large amount of processing power and/or reference data (e.g., library image data representative of various target objects and/or other objects as will be described herein), external system 212 may be better equipped than mixed reality player device 202 to perform the large amounts of image processing and/or to store and have access to the reference data (e.g., in storage facility 214). To this end, storage facility 214 may include a database or other library of object image data and/or any other data as may serve a particular implementation. For example, storage facility 214 may include significantly more storage capacity than that available onboard mixed reality player device 202 (e.g., within computing components 208).

Figure 3:
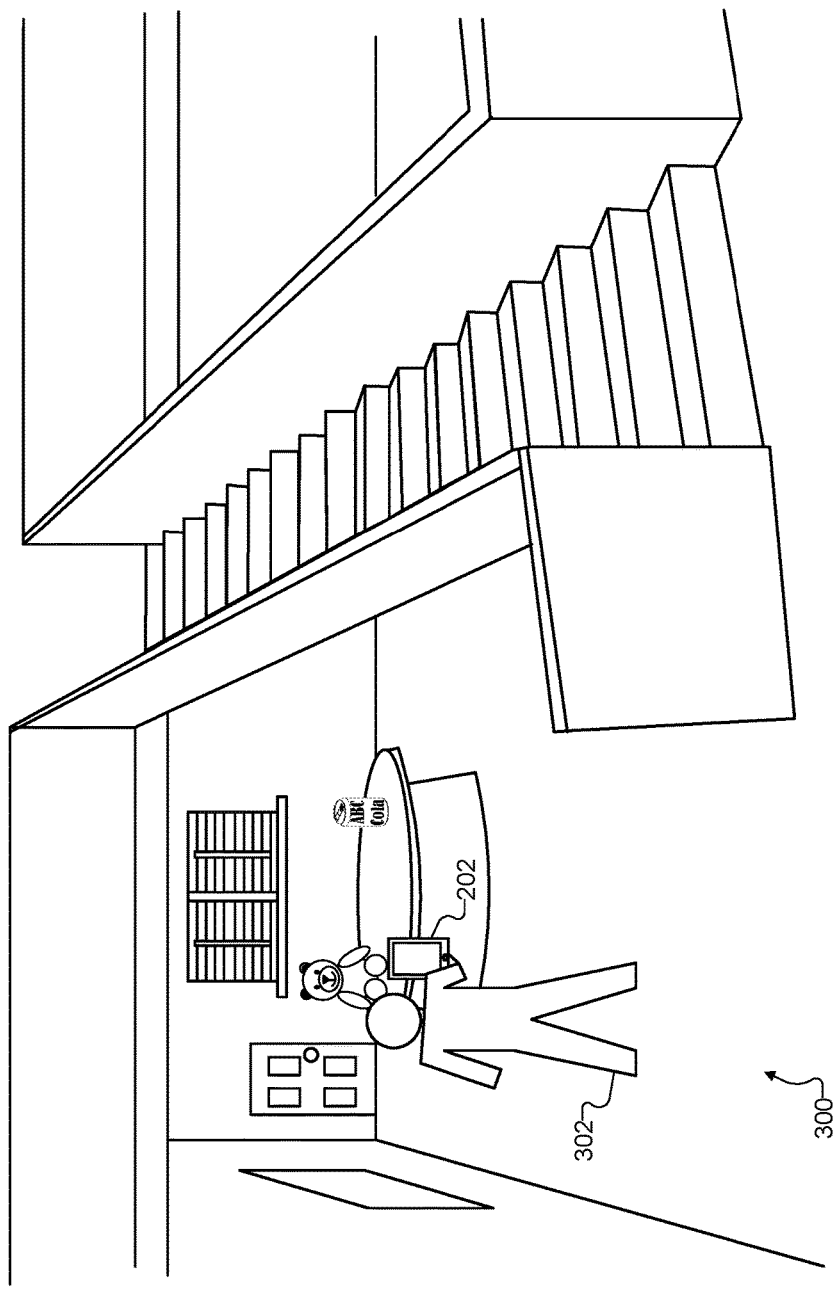
FIG. 3 illustrates an exemplary real-world environment that may be proximate to a mixed reality player device and a user of the mixed reality player device according to principles described herein.

In operation, mixed reality player device 202 may present a mixed reality presentation based on the real-world environment proximate to which (e.g., within which) mixed reality player device 202 is located. To illustrate, FIG. 3 shows an exemplary real-world environment 300 that may be proximate to mixed reality player device 202. A user 302 of mixed reality player device 202 is also shown to be holding mixed reality player device 202 at arm's length to experience the mixed reality presentation associated with real-world environment 300 that mixed reality player device 202 provides. As mentioned above, in certain examples, user 302 may instead wear mixed reality player device 202 as a head-mounted mixed reality device, or may wear a head-mounted display screen that is associated with mixed reality player device 202.

As shown in FIG. 3, real-world environment 300 may include various real objects such as a ceiling, a floor, walls, a window, a door, window blinds, a stairway, and so forth. As will be described in more detail below, certain of these real objects may be target objects that are identifiable by system 100 and, as such, may be capable of virtualization by system 100 in accordance with the principles described herein. As used herein, a "target object" may refer to a real object, animate or inanimate, within a real-world environment that is recognizable to a mixed reality presentation system such as system 100 so that the mixed reality presentation system may virtualize the target object and/or otherwise manipulate the representation of the target object within the mixed reality presentation presented by system 100. For example, target objects may include predesignated objects whose characteristics are stored in a database (e.g. within an implementation of storage facility 108 included within computing components 208 and/or storage facility 214), objects that system 100 has encountered previously, objects that have been automatically "learned" by machine learning and/or artificial intelligence technology implemented within system 100, and/or any other suitable target objects that system 100 is adapted to virtualize or otherwise recognize and manipulate.

Figure 4:
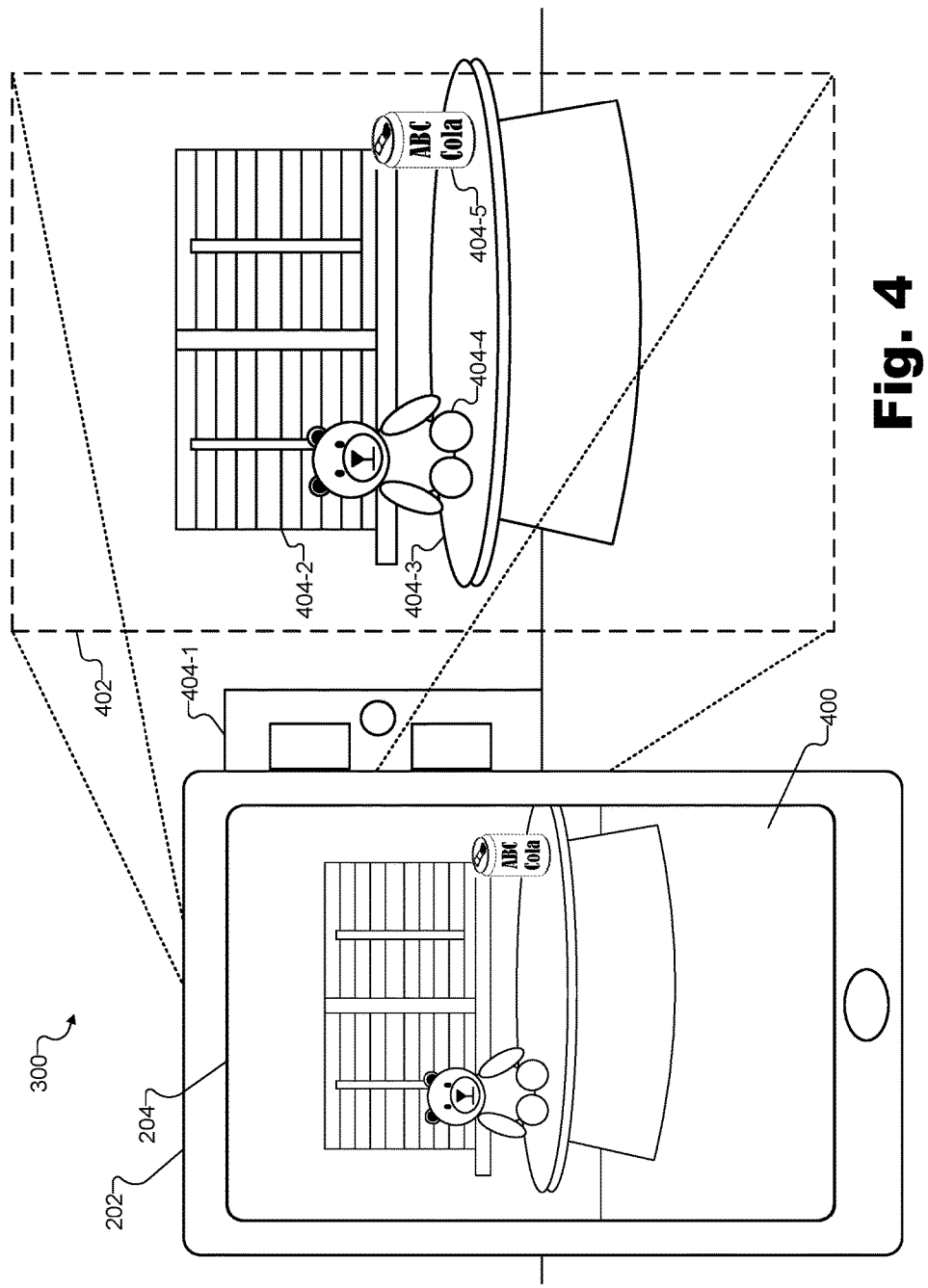
FIG. 4 illustrates an exemplary mixed reality presentation being presented to the user of the mixed reality player device of FIG. 3 while the user and the mixed reality player device are located within the real-world environment of FIG. 3 according to principles described herein.

FIG. 4 illustrates an exemplary mixed reality presentation 400 being presented to user 302 of mixed reality player device 202 (who is not explicitly shown in FIG. 4) while user 302 and mixed reality player device 202 are located within real-world environment 300. Specifically, as shown, mixed reality presentation 400 is based on video data that is captured within a field of view 402 of a camera of mixed reality player device 202 (e.g., capture device 206, not explicitly shown in FIG. 4) and that is presented on display screen 204. As shown, real-world environment 300 may include various real objects (e.g., including certain objects that may be target objects that are recognizable by system 100) that are presented within mixed reality presentation 400 when the objects happen to be within field of view 402. For example, various real objects 404 (e.g., objects 404-1 through 404-5) are explicitly labeled within real-world environment 300. Real objects 404 include a door object 404-1, a window blinds object 404-2, a table object 404-3, a teddy bear object 404-4, and a soda can object 404-5. Other objects such as the wall, floor, and so forth within real-world environment 300 are also illustrated in FIG. 4.

As shown, objects that are within field of view 402 (e.g., objects 404-2 through 404-5) are currently presented within mixed reality presentation 400, while objects that are currently outside field of view 402 (e.g., door object 404-1) are not currently presented within mixed reality presentation 400. However, it will be understood that field of view 402 may change in real time as user 302 moves mixed reality player device 202 to aim the camera in other directions, and mixed reality presentation 400 may be adjusted accordingly.

At the point in time represented by FIG. 4, system 100 may not yet have identified or virtualized any target objects among real objects 404. As such, at this point in time, mixed reality presentation 400 is illustrated as depicting nothing more or less than the reality of real-world environment 300 as represented by the video data captured by the camera of mixed reality player device 202. However, as this video data is accessed and analyzed, system 100 may begin to identify one or more of objects 404 as target objects. For example, system 100 may identify teddy bear object 404-4 as a target object that may be virtualized, as will now be described.

System 100 may identify a target object such as teddy bear object 404-4 in any manner as may serve a particular implementation. For example, system 100 may employ object recognition techniques to identify objects having certain identifiable characteristics (e.g., a piece of furniture with a back and four legs may be recognized as a chair, a vertical planar surface may be recognized as a wall, etc.). In some examples, such object recognition techniques may benefit from data stored during previous encounters of system 100 (or other similar mixed reality presentation systems) with the particular objects included in real-world environment 300 or other similar objects. For example, artificial intelligence techniques, machine learning techniques, and so forth may be employed to allow system 100 to improve its ability to successfully recognize and identify real objects represented within the accessed video data.

Additionally, as mentioned above, system 100 may draw upon a library (e.g., a database) of images of known objects and/or known characteristics of objects such as particular models and brands of particular products or the like. This library may be stored within mixed reality player device 202, within an external system separate from mixed reality player device 202 (e.g., storage facility 214 of external system 212), within another system or device, or distributed between two or more of these in any suitable manner.

Once an object 404 such as teddy bear object 404-4 has been identified as a target object, the object 404 may be virtualized by extracting and replacing the object within mixed reality presentation 400. For example, the object 404 may be virtualized by introducing both an extraction object and a replacement virtual object into a virtual domain that is overlaid onto the content of the video data presented within mixed reality presentation 400.

Figure 5:
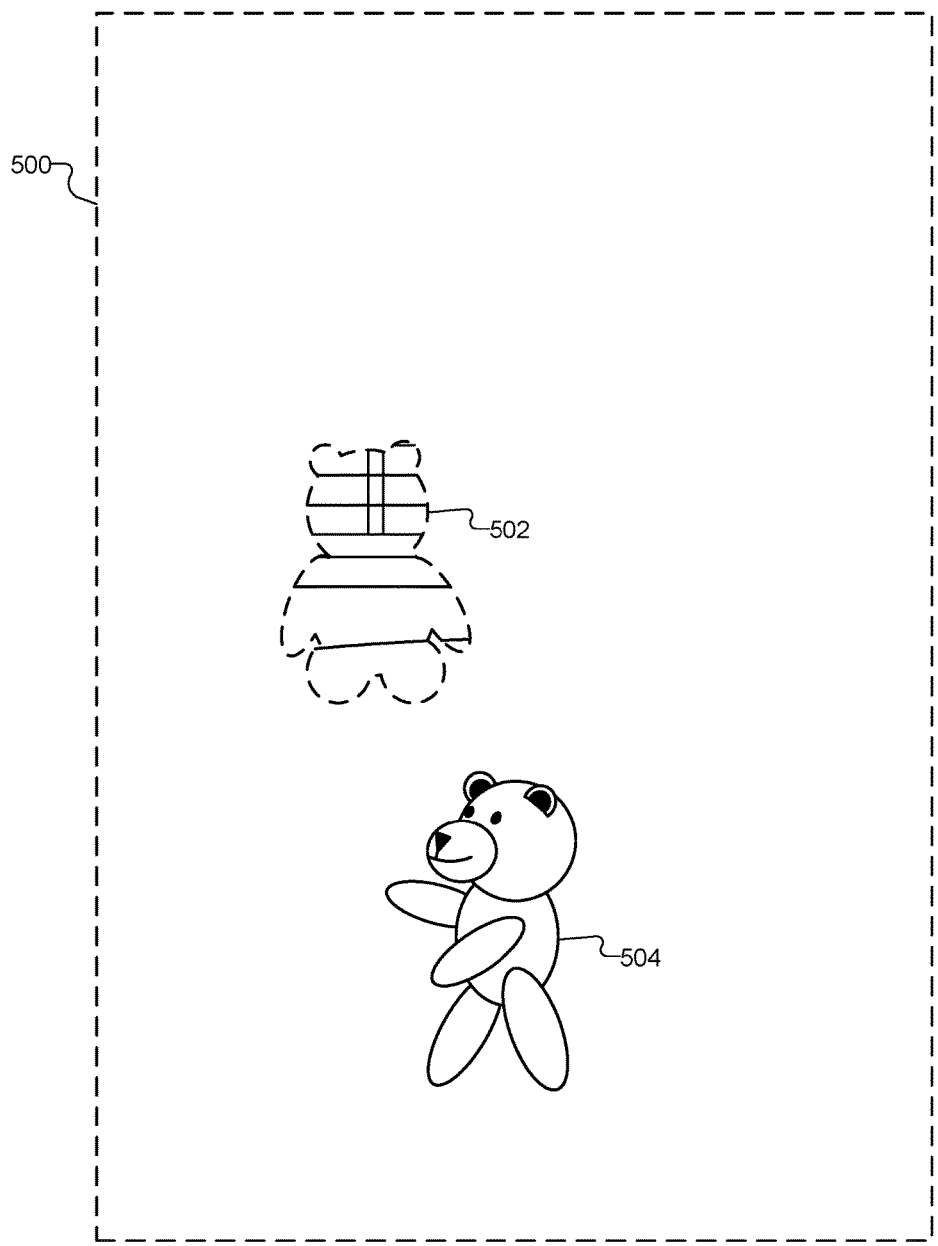
FIG. 5 illustrates an exemplary virtual domain associated with the real-world environment of FIG. 3 according to principles described herein.

To illustrate, FIG. 5 shows an exemplary virtual domain 500 that is associated with real-world environment 300. Virtual domain 500 may be configured to correspond to field of view 402 and to mixed reality presentation 400 in FIG. 4. For example, virtual domain 500 may be configured to be the same size, same aspect ratio, same resolution, etc. as mixed reality presentation 400 such that virtual domain 500 may be overlaid on top of the content within mixed reality presentation 400 represented by the accessed video data. More specifically, for example, virtual domain 500 may be configured such that the blank areas within virtual domain 500 are masked to show the video data illustrated in mixed reality presentation 400 within FIG. 4, while the non-blank areas are displayed on top of (e.g., instead of) the corresponding areas of the video data.

In FIG. 5, virtual domain 500 includes two non-blank areas that are to be overlaid on video content of mixed reality presentation 400. Specifically, virtual domain 500 illustrates an extraction object 502 and a virtual object 504 (e.g., also referred to herein as a replacement virtual object).

Extraction object 502 is aligned within virtual domain 500 so as to cover teddy bear object 404-4 within the video content currently being presented within mixed reality presentation 400. In this way, teddy bear object 404-4 may be extracted from mixed reality presentation 400. As used herein, "extracting" a target object such as teddy bear object 404-4 refers to virtually removing, obscuring, camouflaging, or otherwise hiding the target object so as to make the target object seem to disappear or to be otherwise modified without necessarily affecting the appearance of other real objects around the target object.

Extracting a target object in this way may represent one aspect of methods and systems for virtualizing a target object within a mixed reality presentation that is particularly distinct from conventional mixed reality technologies. Conventionally, if a target object is to be "replaced" in a mixed reality presentation, the target object may simply be covered or overlaid with a virtual object (e.g., a virtual object other than an extraction object). For example, a mixed reality technology for modifying an appearance of a user's face may identify the user's nose and "replace" the nose using a virtual object (e.g., a different nose selected by the user). However, the replacement nose in this example may be configured to move and behave identically to the target object it is covering. As such, the replacement nose may be persistently presented on top of the target object nose within the mixed reality presentation and the target object (i.e., real nose) is not extracted, as that term is used herein, due to being persistently covered by the virtual object.

In contrast, as shown in FIG. 5, extraction object 502 is generated so as to mimic the object or objects occluded by teddy bear object 404-4 (e.g., part of window blinds object 404-2, part of table object 404-3, and part of the wall between them) from the perspective of mixed reality player device 200. As such, extraction object 502 may be configured to fill in the content that is occluded within the video data by teddy bear object 404-4 to produce the effect that teddy bear object 404-4 has been removed from the scene leaving nothing in its place. Advantageously, by extracting teddy bear object 404-4 in this way, virtual object 504 may replace teddy bear object 404-4 within mixed reality presentation 400 without needing to mimic the behavior of teddy bear object 404-4 (i.e., so as to persistently cover up teddy bear object 404-4). Rather, virtual object 504 may be implemented as a representation of teddy bear object 404-4 (e.g., an animated 3D model of teddy bear object 404-4) that is separate and independent from teddy bear object 404-4, such as by being positioned, being animated, or otherwise behaving independently of teddy bear object 404-4 within mixed reality presentation 400.

For example, as shown, virtual object 504 that replaces teddy bear object 404-4 within mixed reality presentation 400 may implement an animated representation of teddy bear object 404-4 that appears to move (e.g., within mixed reality presentation 400 and over a period of time) from a first location coincident with a first location of teddy bear object 404-4 within real-world environment 300 (e.g., seated on the table) to a second location distinct from the first location (e.g., to a different part of the table, to the floor under the table, etc.). In other words, teddy bear object 404-4 may be virtualized so as to appear to come to life, stand up from where teddy bear object 404-4 is actually located, and move around the room freely.

To extract teddy bear object 404-4, extraction object 502 may be generated and added to virtual domain 500 in any manner as may serve a particular implementation. For example, extraction object 502 may be generated based on an automatic extrapolation of what is behind teddy bear object 404-4 from the perspective of mixed reality player device 202, or, in other words, an extrapolation of the areas of one or more real objects that are being occluded by teddy bear object 404-4.

Specifically, system 100 may extract a target object such as teddy bear object 404-4 from a mixed reality presentation such as mixed reality presentation 400 by performing one or more of the following operations in the order given or in another suitable order. First, system 100 may identify an occluded area of the real-world environment (e.g., real-world environment 300) that is not represented in the accessed video data due to being occluded from view (e.g., from a vantage point of mixed reality player device 202 capturing the accessed video data) by the target object (e.g., teddy bear object 404-4). Second, system 100 may determine that the occluded area that was identified is not occluded from view by the virtual object that replaces the target object (e.g., virtual object 504) within the mixed reality presentation from a vantage point of the user. For example, system 100 may determine that virtual object 504 is to be walking around on the floor under the table such that virtual object 504 will not similarly occlude the objects that teddy bear object 404-4 occludes in real-world environment 300. Third, system 100 may generate an extraction object (e.g., extraction object 502) to include an extrapolation of video data representative of the occluded area (e.g., the portions of window blinds object 404-2, table object 404-3, etc., that are occluded by teddy bear object 404-4) based on a representation within the accessed video data of one or more real objects associated with the occluded area (e.g., based on a representation of window blinds object 404-2, table object 404-3, etc.). Fourth, system 100 may overlay the generated extraction object onto the occluded area within the mixed reality presentation. For example, system 100 may overlay the extraction object (e.g., extraction object 502) on the video content associated with the target object so as to cover teddy bear object 404-4 to give the appearance the teddy bear object 404-4 has been removed from real-world environment 300.

Extrapolating occluded data may be performed based on representations of real objects associated with the occluded area in any suitable manner. For instance, in the example of extrapolating the area behind teddy bear object 404-4 to generate the extrapolated data in extraction object 502, system 100 may use the video data representative of window blinds object 404-2, table object 404-2, the wall behind teddy bear object 404-4, or the like. Based on the video data, for instance, system 100 may determine that the horizontal lines of window blinds object 404-2 continue straight through in the area occluded by teddy bear object 404-4 in the same manner as the areas immediately around teddy bear object 404-4 that are not occluded. Similarly, system 100 may determine that the vertical lines of the partially occluded handle of window blinds object 404-2 extend down the same amount as the other handle of window blinds object 404-2 that is not occluded (i.e., so as to be symmetrical). The occluded curves of table object 404-3, as well as occluded colors and/or patterns that may characterize the table, window blinds, or walls, may similarly be extrapolated by system 100 based on contextual clues from the video data of non-occluded areas around teddy bear object 404-4 in a similar way. In some examples, machine learning and/or artificial intelligence techniques may allow system 100 to intelligently extrapolate occluded images based on various aspects (e.g., shapes, colors, pattern, symmetry, etc.) of one or more objects being partially occluded in any manner as may serve a particular implementation.

Additionally or alternatively, system 100 may look beyond contextual clues from non-occluded portions of objects to base the extrapolation on a non-occluded image of the occluded object. For example, system 100 may additionally or alternatively extract the target object from the mixed reality presentation by accessing data representative of one or more non-occluded images of the one or more real objects associated with the occluded area (e.g., non-occluded images of window blinds object 404-2, table object 404-3, etc.) and by extrapolating video data representative of the occluded area based on the one or more non-occluded images of the one or more real objects associated with the occluded area. For example, system 100 may have captured a fully non-occluded image of window blinds object 404-2 and/or table object 404-3 at an earlier time during mixed reality presentation 400 (e.g., when mixed reality player device 202 had a different vantage point as user 302 moves mixed reality player device 202 around real-world environment 300, before teddy bear object 404-4 was placed on the table, etc.). In other examples, system 100 may have captured such a non-occluded image of window blinds object 404-2 during a previous mixed reality presentation in which portions of real-world environment were mapped and stored for later use, during a room calibration procedure performed previously to allow the system to scan or map out real-world environment 300 for optimal performance, or at another suitable time.

In certain implementations, such non-occluded images of the objects associated with the occluded area may not have been captured by mixed reality player device 202 at any time but, rather, may come from a database or library of images of known objects. For example, system 100 may perform extrapolation based at least partially on non-occluded images of window blinds objects (e.g., including images of the same brand and model of window blinds as window blinds object 404-2 or similar models of window blinds) that are included in a library of objects. The library may further include images of tables similar to table object 404-3 and/or various other images of common objects around the room that may be occluded by target objects that are to be extracted. As mentioned above, in some examples, a database of such images may be stored externally to mixed reality player device 202, such as within a storage facility of an external system (e.g., storage facility 214 of external system 212).

It will be understood that extrapolating video data of occluded areas based on a representation of real objects associated with the occluded areas may not be perfect and, as such, may at times require estimation that will result in imperfect extraction objects. However, it will also be understood that as system 100 is repeatedly used in the same real-world environment with the same types of objects over time, system 100 may improve its ability to extrapolate accurate video data. For example, as mentioned above, techniques related to machine learning and artificial intelligence may be employed to help system 100 improve at identifying patterns, efficiently identifying template objects from databases (specific models of specific products, previously analyzed objects, etc.), extrapolating shapes and textures based on contextual clues (e.g., symmetry, etc.), and so forth.

Once a target object such as teddy bear object 404-4 has been extracted from real-world environment 300 (e.g., once an extraction object such as extraction object 502 has been successfully generated and inserted into virtual domain 500), system 100 may replace the target object in any suitable way. For example, system 100 may replace the target object with a virtual object by generating a model (e.g., a 2D or 3D model) of the target object to serve as the second virtual object implementing the representation of the target object (e.g., generating virtual object 504 as a 3D model of teddy bear object 404-4). System 100 may generate the virtual object that implements the representation of the target object in any suitable manner. For instance, system 100 may access (e.g., from a database associated with storage facility 108 or from another suitable source) data representative of a model of the target object and may process the data to appropriately size or scale the model, orient the model in space, provide shading and other lighting effects for the model, and/or otherwise prepare the model to be inserted into and/or integrated with virtual domain 500. In other examples, rather than accessing data representative of the model (e.g., in examples where such data does not yet exist), system 100 may generate such data based on captured video data that has been and/or is being captured of the target object. Having generated the model, system 100 may continue replacing the target object by integrating the model of the target object into the virtual domain of the mixed reality presentation (e.g., integrating virtual object 504 into virtual domain 500) and manipulating the model of the target object to behave differently (e.g., within the virtual domain of the mixed reality presentation) than the target object behaves within the real-world environment. For example, system 100 may manipulate the 3D model of teddy bear object 404-4 implemented by virtual object 504 to come to life, walk around real-world environment 300, interact with other objects within real-world environment 300, etc., rather than continuing to sit on the table mimicking the lifeless behavior of teddy bear object 404-4.

System 100 may manipulate the virtual model to perform these behaviors in any suitable manner. For instance, system 100 may manipulate the 3D model of the target object (e.g., virtual object 504) to behave differently than the target object (e.g., teddy bear object 404-4) based on a user command from a user to direct the 3D model to behave in a particular manner that is different from how the target object behaves within the real-world environment. For example, user 302 may use mixed reality player device 202 to control virtual object 504 and cause virtual object 504 to perform certain behaviors. Additionally or alternatively, system 100 may automatically manipulate the 3D model of the target object based on artificial intelligence associated with the 3D model and configured to cause the 3D model to automatically behave in the particular manner without the user command. For example, artificial intelligence included within system 100 may be associated with virtual object 504 to cause virtual object 504 to appear to take on a life of its own that is independent from any direction provided by user 302.

As target objects are extracted from real-world environment 300 and/or as virtual objects are added to virtual domain 500 to replace the extracted target objects, additional effects may be applied to increase the realism and immersiveness of mixed reality presentation 400. For instance, in certain implementations, system 100 may be configured to simulate the interaction of virtual objects and/or extraction objects (i.e., the virtual absence of real objects that are actually present) with light sources that illuminate the real-world environment. For example, a virtual object such as virtual object 504 that is added to virtual domain 500 for presentation within mixed reality presentation 400 may look more realistic if the virtual object appears to cast a similar shadow within real-world environment 300 as a real object would cast and/or if the virtual object is illuminated from the angle and with the brightness, color, etc., of the actual light sources illuminating real-world environment 300. Similarly, an extracted target object such as teddy bear object 404-4 that is removed from real-world environment 300 by the addition of an extraction object such as extraction object 502 to virtual domain 500 may also appear most realistic when shadows cast by the extracted target object are removed and/or other lighting effects are accounted for.

Figure 6A:
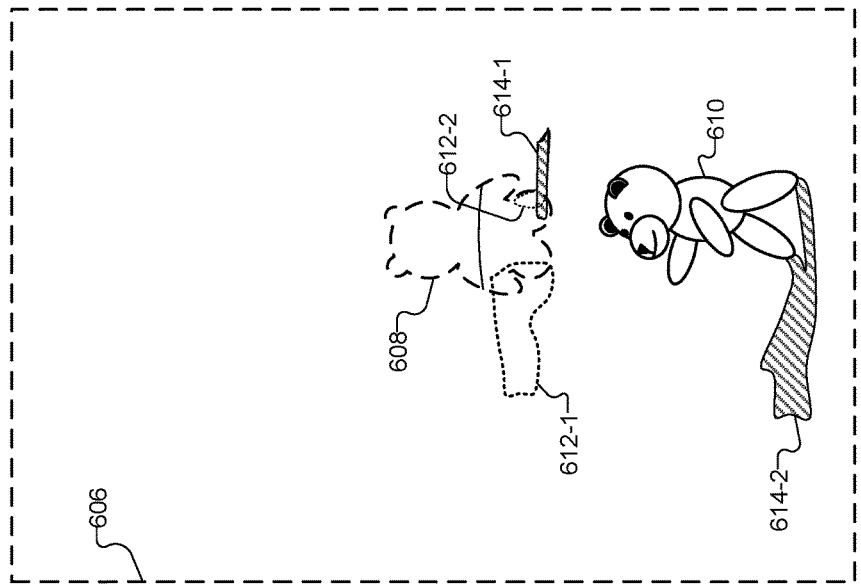
FIG. 6A illustrates an exemplary light source within the real-world environment of FIG. 3 and various exemplary characteristics of light being projected by the light source onto target objects within the real-world environment according to principles described herein.

To illustrate, FIG. 6A shows an exemplary light source 602 within real-world environment 300 and various exemplary characteristics of light being projected by light source 602 onto target objects within real-world environment 300. Specifically, for instance, light source 602 is shown in FIG. 6A to illuminate teddy bear object 404-4 and soda can object 404-5 such that these objects cast shadows 604 (i.e., shadow 604-1 of teddy bear object 404-4 and shadow 604-2 of soda can object 404-5). Because of a relatively close proximity of objects 404-4 and 404-5 in FIG. 6A, part of shadow 604-2 of soda can object 404-5 is shown to rest on teddy bear object 404-4. It will be understood that other objects such as table object 404-3 may similarly cast shadows as a result of illumination by light source 602 although such details are omitted from FIG. 6A for clarity.

System 100 may account for lighting effects caused by light source 602 and/or other light sources within real-world environment 300 in any manner as may serve a particular implementation. For example, system 100 may identify one or more light sources (e.g., such as light source 602) that project light onto target objects (e.g., such as teddy bear object 404-4 and soda can object 404-5) within real-world environment 300 based on the accessed video data. As user 302 points the camera of mixed reality player device 202 in different directions around the room, for instance, system 100 may identify one or more light sources such as light fixtures, lamps, windows through which sunlight is streaming, and so forth. In some examples, light sources may be identified by mapping out the light sources during one mixed reality presentation, storing data representative of the locations and/or characteristics of the light sources, and recalling that stored data during a later mixed reality presentation. Over time, by combining this strategy with technologies such as machine learning, system 100 may develop an accurate and sophisticated model of the lighting of a particular real-world environment such as real-world environment 300 at different times of day and/or in different circumstances (e.g., with different light sources turned on and off).

Once a light source such as light source 602 is identified, system 100 may determine a characteristic of the identified light source by, for example, analyzing light being projected onto the target objects by the identified light source. Characteristics that may be identified for each light source may include a strength or brightness of the light source, a trajectory of the light source, a color of light generated by the light source, a degree of diffusion of the light generated by the light source, and so forth. Based on the determined characteristics of the light source, system 100 may simulate the identified light source within the virtual domain of the mixed reality presentation.

In addition or as an alternative to directly identifying and characterizing light sources in this way, system 100 may also identify and characterize the lighting in a real-world environment based on an analysis of shadows cast by real objects within the real-world environment. For instance, it may be desirable for system 100 to simulate the interaction of virtual objects within the virtual domain with one or more light sources that have not yet been identified and/or fully analyzed with respect to their particular lighting characteristics. More specifically, it may be desirable for system 100 to simulate a light source in a real-world environment that is new to system 100 (e.g., a real-world environment for which system 100 has not yet had sufficient time and/or data to map out the light sources, a real-world environment for which system 100 does not have access to stored data associated with the lighting, etc.). In such examples, system 100 may estimate the respective locations and characteristics of one or more light sources illuminating the real-world environment based on the lighting and shadows on real objects represented in the video data accessed by system 100.

Figure 6B:
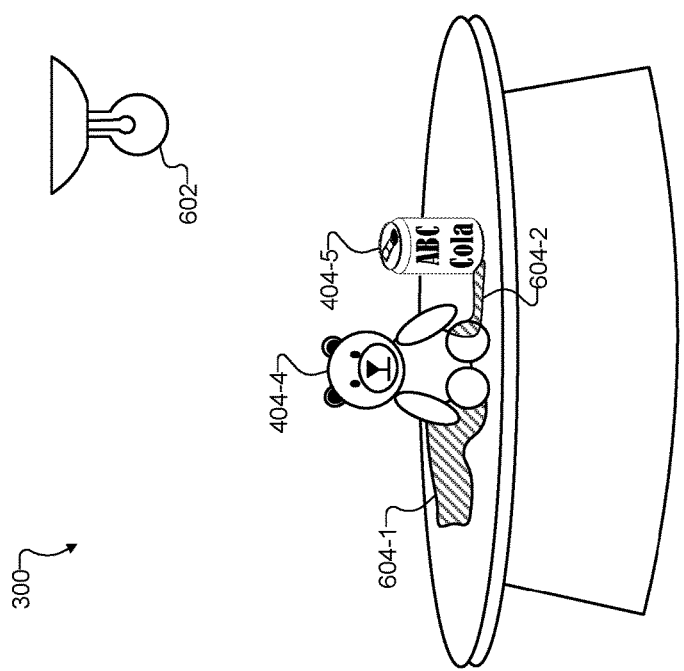
FIG. 6B illustrates an exemplary virtual domain in which the light source of FIG. 6A is simulated with respect to various virtual objects included within the virtual domain according to principles described herein.

Once light sources have been identified and/or characterized in any of these ways and/or in another suitable manner, system 100 may simulate the interaction of virtual objects within the virtual domain with the identified and characterized light sources in any manner as may serve a particular implementation. To illustrate certain examples of such lighting simulation, FIG. 6B shows an exemplary virtual domain 606 in which light source 602 is simulated with respect to various virtual objects included within virtual domain 606. Specifically, virtual domain 606 includes an extraction object 608 associated with teddy bear object 404-4 (e.g., an extraction object that fills in extrapolated details related to the table and background that teddy bear object 404-4 is occluding), and a virtual object 610 associated with teddy bear object 404-4 (e.g., an animated 3D model of teddy bear object 404-4 that is configured to behave differently than teddy bear object 404-4). For example, extraction object 608 and virtual object 610 may be analogous to (e.g., may be implementations of) extraction object 502 and virtual object 504 of virtual domain 500 described above.

Having analyzed and characterized light source 602, system 100 may simulate the interaction of light from light source 602 with extraction object 608 and/or virtual object 610 in any suitable way. For example, the simulating of light source 602 within virtual domain 606 may include simulating an effect of light source 602 on an area of the real-world environment that is affected, with respect to lighting, by the extracting of the target object of teddy bear object 404-4. Specifically, as shown, system 100 may implement a shadow extraction object 612-1 to remove an effect of shadow 604-1 of teddy bear object 404-4. For instance, system 100 may change (e.g., brighten) the color of the area of the table where shadow 604-1 is cast by teddy bear object 404-4 to effectively remove the shadow of teddy bear object 404-4 to thereby help complete the visual effect of teddy bear object 404-4 being extracted from real-world environment 300.

Moreover, as another example of how system 100 may simulate the interaction of light from light source 602 with virtual domain 606, the simulating of light source 602 within virtual domain 600 may include simulating an effect of light source 602 on an extrapolated area of the real-world environment that is presented, within the mixed reality presentation, in place of an area of the real-world environment that is occluded from view by the target object and not by the virtual object that replaces the target object. Specifically, for instance, an area of the table under the foot of teddy bear object 404-4 in FIG. 6A (e.g., an area upon which a portion of shadow 604-2 of soda can object 404-5 would fall if not for teddy bear object 404-4) may be occluded from view in real-world environment 300 by teddy bear object 404-4 while not being occluded in virtual domain 606 by replacement virtual object 610. As such, system 100 may simulate shadow 604-2 of soda can object 404-5 within virtual domain 606 by revising or replacing shadow 604-2 with virtual shadow 614-1, which does not have a portion that is cast onto teddy bear object 404-4. Additionally, as shown, a shadow extraction object 612-2 that removes the portion of shadow 604-2 on the foot of teddy bear object 404-4 may be included within occlusion object 608. As shown, correcting shadow 604-2 using virtual shadow 614-2 and/or shadow extraction object 612-2 may further help complete the visual effect of teddy bear object 404-4 being extracted from real-world environment 300.

As yet another example of how system 100 may simulate the interaction of light from light source 602 with virtual domain 606, the simulating of light source 602 within virtual domain 600 may include simulating an effect of light source 602 on the virtual object that replaces the target object within the mixed reality presentation (e.g., on virtual object 610, which is inserted into virtual domain 606 to replace teddy bear object 404-4). Specifically, as shown, a virtual shadow 614-2 may be added to virtual domain 606 to simulate the interaction between virtual object 610 and light source 602. For example, system 100 may determine an area of real-world environment 300 (e.g., the floor upon which virtual object 610 appears to be walking) onto which virtual object 610 would cast a shadow, and may alter (e.g., darken) the color and appearance of that area to simulate virtual shadow 614-2.

Regardless of whether lighting effects are simulated in the manner described in relation to FIGS. 6A and 6B, in another suitable manner, or are not simulated in a particular virtual domain, the virtual domain may be overlaid onto video data representative of a real-world environment that is being captured and accessed in real time to create a mixed reality presentation.

Figure 7:
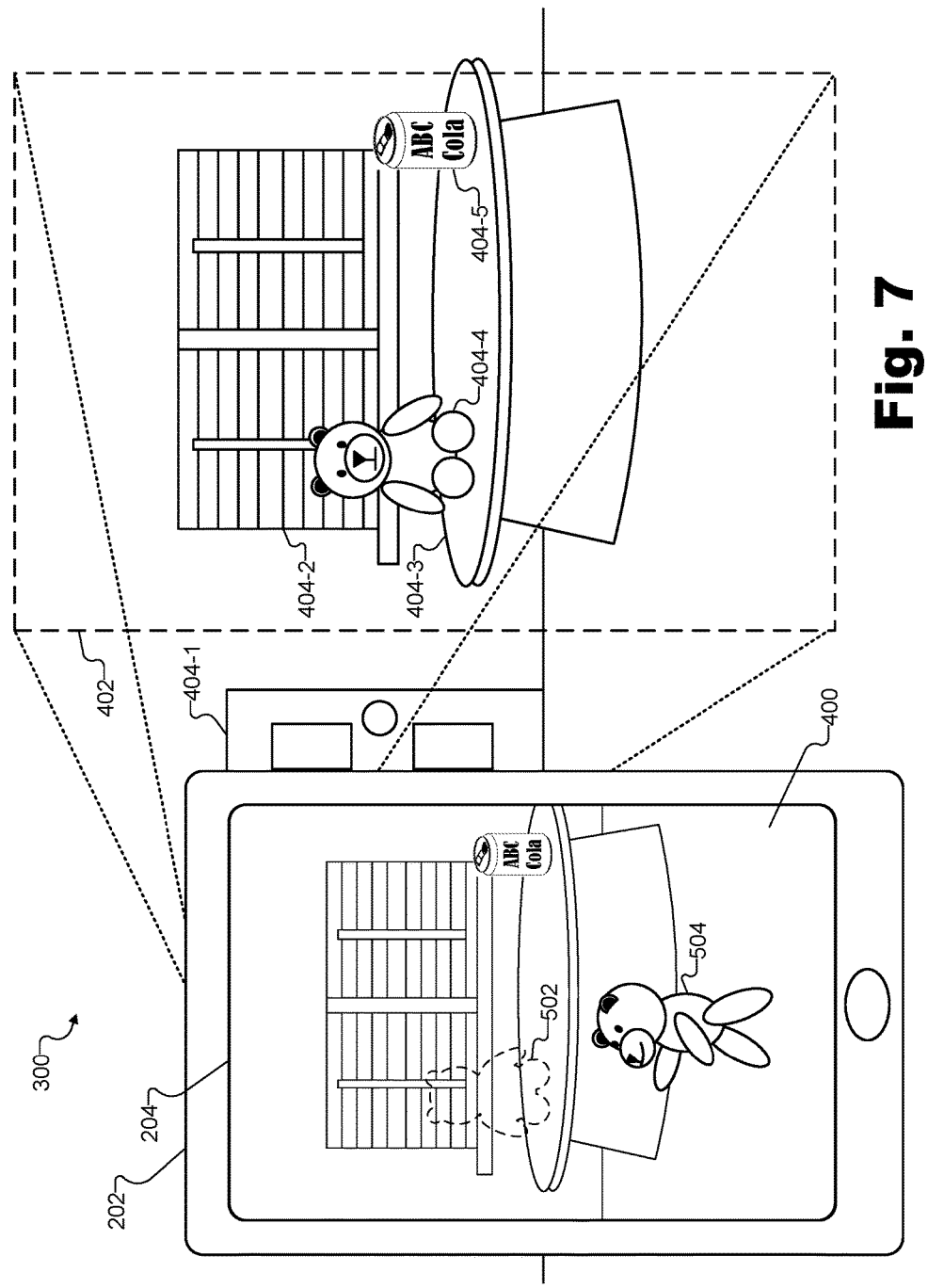
FIG. 7 illustrates an exemplary view of the mixed reality presentation of FIG. 4 according to principles described herein.

To illustrate, FIG. 7 shows mixed reality presentation 400 as virtual object 504 within virtual domain 500 replaces the target object of teddy bear object 404-4 within real-world environment 300. As shown, the overlay of extraction object 502 within mixed reality presentation 400 makes teddy bear object 404-4 effectively disappear such that the overlay of virtual object 504 gives the appearance that teddy bear object 404-4 has come to life, has climbed off table object 404-3, and is now walking around on the floor near table object 404-3 (i.e., performing different behavior than teddy bear object 404-4 at a location distinct from the location of teddy bear object 404-4 within real-world environment 300). While not explicitly illustrated in FIG. 7, it will be understood that, in certain implementations, lighting effects (e.g., virtual shadows, extractions of real shadows, etc.) of light sources identified and/or characterized for real-world environment 300 may be simulated for extraction object 502, virtual object 504, and so forth in accordance with principles described herein.

As mixed reality presentation 400 proceeds, additional target objects (i.e., besides teddy bear object 404-4) may also be identified and virtualized in a similar manner as teddy bear object 404-4 is shown to be virtualized in FIG. 7. For instance, in certain implementations, system 100 may continuously analyze video data captured for real-world environment 300 to attempt to recognize and identify as many target objects within real-world environment 300 as possible so as to virtualize each target object that is identified.

In other implementations, however, system 100 may take a more nuanced or conservative approach to virtualizing potential target objects within real-world environment 300. In order to provide certain benefits related to allowing users to remain firmly grounded and immersed in the real world while still benefitting from certain virtual aspects of a mixed reality presentation, as described above, it will be recognized that it may not be desirable for system 100 to virtualize too many target objects within real-world environment 300, especially to the extent that all of these target objects are virtualized at the same time or during a short period of time. For example, users may feel distracted, disoriented, or otherwise removed from grounded immersion in the real world when many objects all around real-world environment 300 are virtualized at once with no apparent cause or pattern. For instance, the automatic virtualization of many objects within real-world environment 300 (especially within a short period of time) may make mixed reality presentation 400 feel less like a mixed reality presentation to the user and more like a purely virtual reality presentation, which may not be what the user desires when choosing to engage in a mixed reality experience with a mixed reality presentation system.

Moreover, analyzing large amounts of video data to recognize and identify every possible target object within view as quickly as possible may require a relatively large amount of processing resources from the finite amount of processing resources available to system 100. As such, to keep up with ongoing target object analysis operations in implementations attempting to virtualize as many target objects as possible as quickly as possible, undesirable compromises may be required with respect to other processing operations such as operations involving the maintenance of the virtual domain and virtual objects included therein.

Accordingly, for these and other reasons, it may be desirable, in certain implementations, for system 100 to be selective with respect to target objects within a real-world environment that are analyzed and/or virtualized. For example, it may be desirable in these implementations for system 100 to analyze and/or virtualize only a certain number of potential target objects at a time (e.g., one at a time), rather than attempting to analyze and/or virtualize all the potential target objects at once or as quickly as possible.

System 100 may implement this selectivity in any manner as may serve a particular implementation. For example, when one target object that has been virtualized is represented by an animated character such as virtual object 504, system 100 may virtualize objects that the animated character appears to "see" and/or with which the animated character is able to interact. Specifically, in certain examples, the virtual object that replaces the target object within the mixed reality presentation may be an animated character (e.g., such as is the case with target object 504 replacing teddy bear object 404-4 within mixed reality presentation 400). As such, system 100 may identify an additional target object among the real objects included within the real-world environment while the animated character is presented within the mixed reality presentation and while the additional target object is included within a field of view of the animated character. For example, system 100 may identify soda can object 404-5 within real-world environment 300 while target object 504 is presented within mixed reality presentation 400 and while soda can object 404-5 is included within a field of view of target object 504 (e.g., while target object 504 is facing soda can object 404-5 so as to appear to be able to "see" soda can object 404-5).

Once the additional target object is identified, system 100 may extract the additional target object from the mixed reality presentation by overlaying a third virtual object (e.g., an extraction object for the additional target object) included within the virtual domain onto the mixed reality presentation in alignment with the additional target object, may replace the additional target object within the mixed reality presentation by overlaying a fourth virtual object included within the virtual domain onto the mixed reality presentation out of alignment with the additional target object, and may present an interaction between the animated character and the fourth virtual object. For example, upon identifying soda can object 404-5 when virtual object 504 appears to "see" soda can object 404-5, system 100 may extract soda can object 404-5 from mixed reality presentation 400 (e.g., by overlaying an appropriate extraction object within the virtual domain), replace soda can object 404-5 with a virtual object implemented as a 3D model of the soda can, and present an interaction between virtual object 504 and the 3D model of the soda can.

Figure 8:
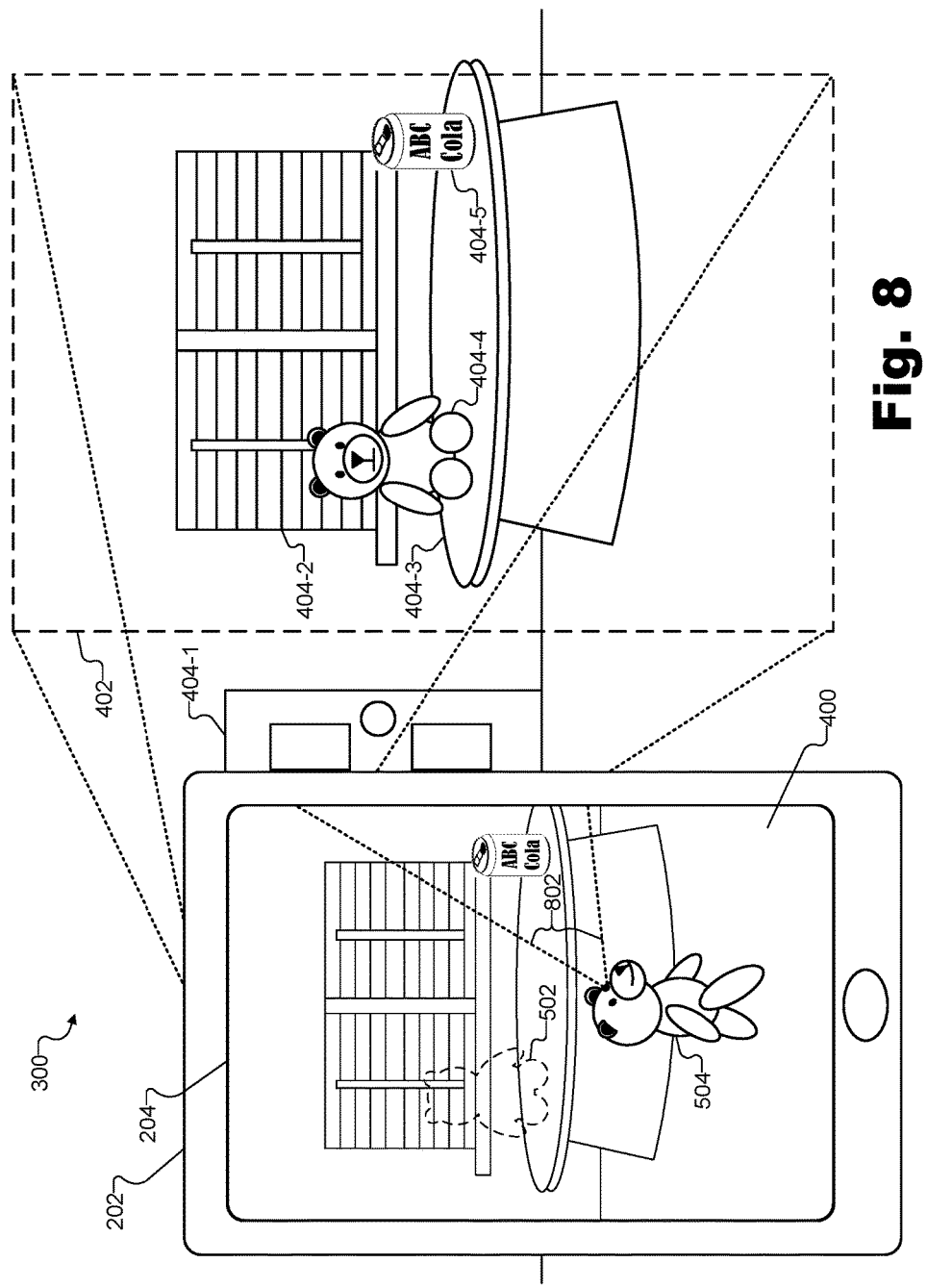
FIG. 8 illustrates another exemplary view of the mixed reality presentation of FIG. 4 according to principles described herein.

To illustrate, FIG. 8 shows mixed reality presentation 400 as virtual object 504 within virtual domain 500 has replaced teddy bear object 404-4 within real-world environment 300, and as an additional target object (i.e., soda can object 404-5) is presented within a field of view of an animated character associated with virtual object 504. Specifically, as shown, the animated character implementing virtual object 504 (i.e., the teddy bear that has appeared to come to life and now is shown to be walking around real-world environment 300) may be associated with a field of view 802 (illustrated with dotted lines in mixed reality presentation 400 but which will be understood to be invisible within certain implementations of mixed reality presentation 400) that may intersect with certain potential target objects within real-world environment 300 at certain times. For example, as the animated character is shown to explore real-world environment 300, the animated character may appear to spot a particular target object of interest such as soda can object 404-5. In some examples, only once the animated character has appeared to see soda can object 404-5 (e.g., only once soda can object 404-5 has fallen squarely within field of view 802), may system 100 proceed to virtualize soda can object 404-5 to allow the animated character of virtual object 504 to interact with the soda can object.

Figure 9:
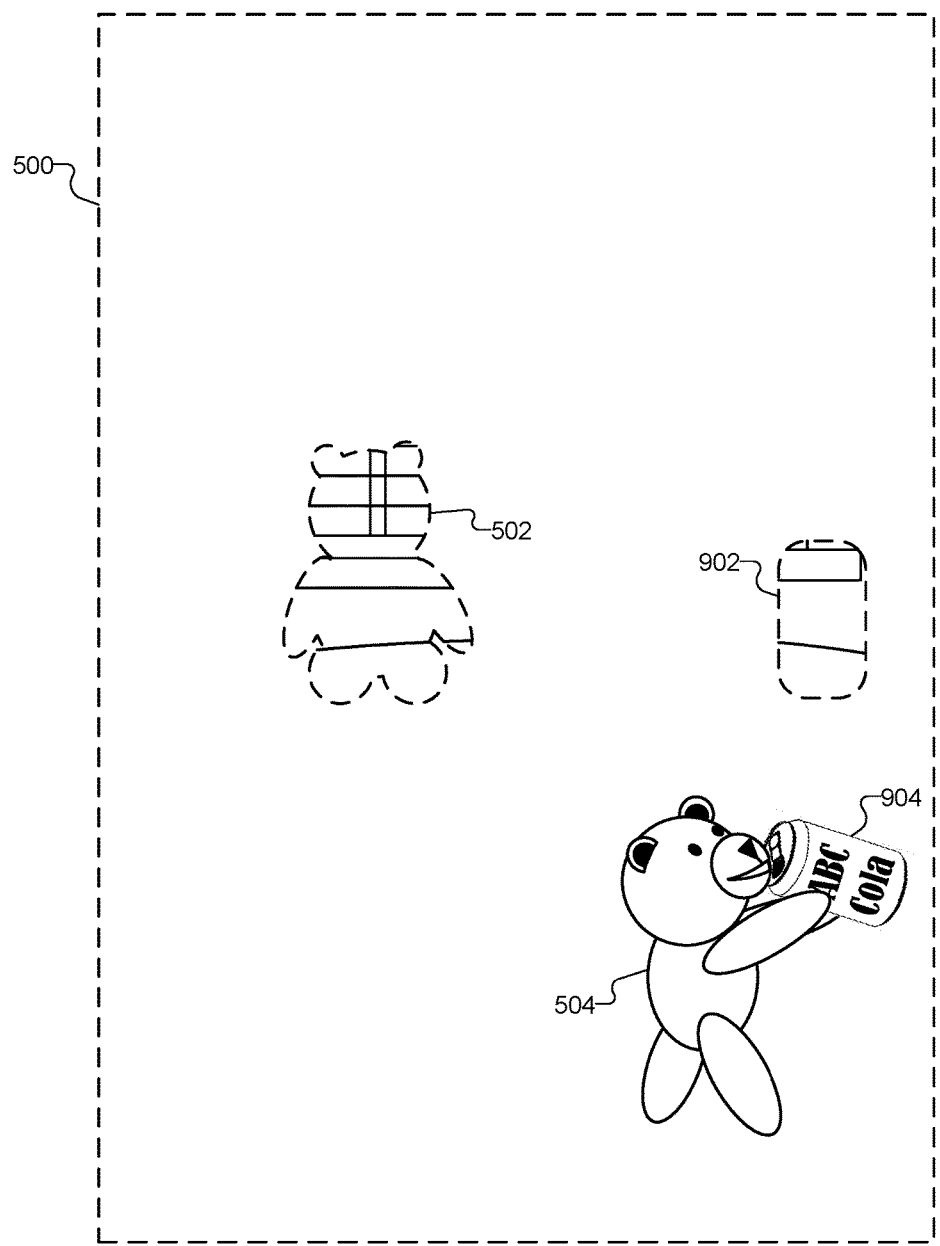
FIG. 9 illustrates an exemplary view of the virtual domain of FIG. 5 according to principles described herein.

FIG. 9 illustrates virtual domain 500 as an additional virtual object replaces the additional target object of soda can object 404-5. Specifically, in a similar manner as teddy bear object 404-4 was described above as being extracted and replaced within mixed reality presentation 400, soda can object 404-5 may be similarly extracted by generating an extraction object 902 and a corresponding virtual object 904. While virtual object 904 may not be an animated character as was virtual object 504, virtual object 904 may still be a 3D model or other suitable representation of soda can object 404-5 that may be located in a different location and/or may be given different behavior than soda can object 404-5. For instance, in certain examples, virtual object 904 may be configured to interact with (and/or to be interacted with by) the animated character of virtual object 504. For example, as shown, within virtual domain 500, virtual object 504 may approach virtual object 904, pick up and move virtual object 904 (i.e., leaving behind extraction object 902), open the soda can of virtual object 904, and appear to drink the soda from virtual object 904. Afterwards, the virtual character of virtual object 504 may appear to return the soda can to its original position on the table, may appear to destroy and/or discard the soda can, and/or may continue to interact with the soda can and/or other virtualized target objects within real-world environment 300 as may serve a particular implementation.

While not explicitly illustrated in FIG. 9, it will be understood that lighting effects may be simulated with respect to extraction object 902 and/or virtual object 904 in the same or similar ways as described herein for other objects such as for extraction object 502 and/or virtual object 504 (e.g., as described in relation to FIGS. 6A and 6B).

Figure 10:
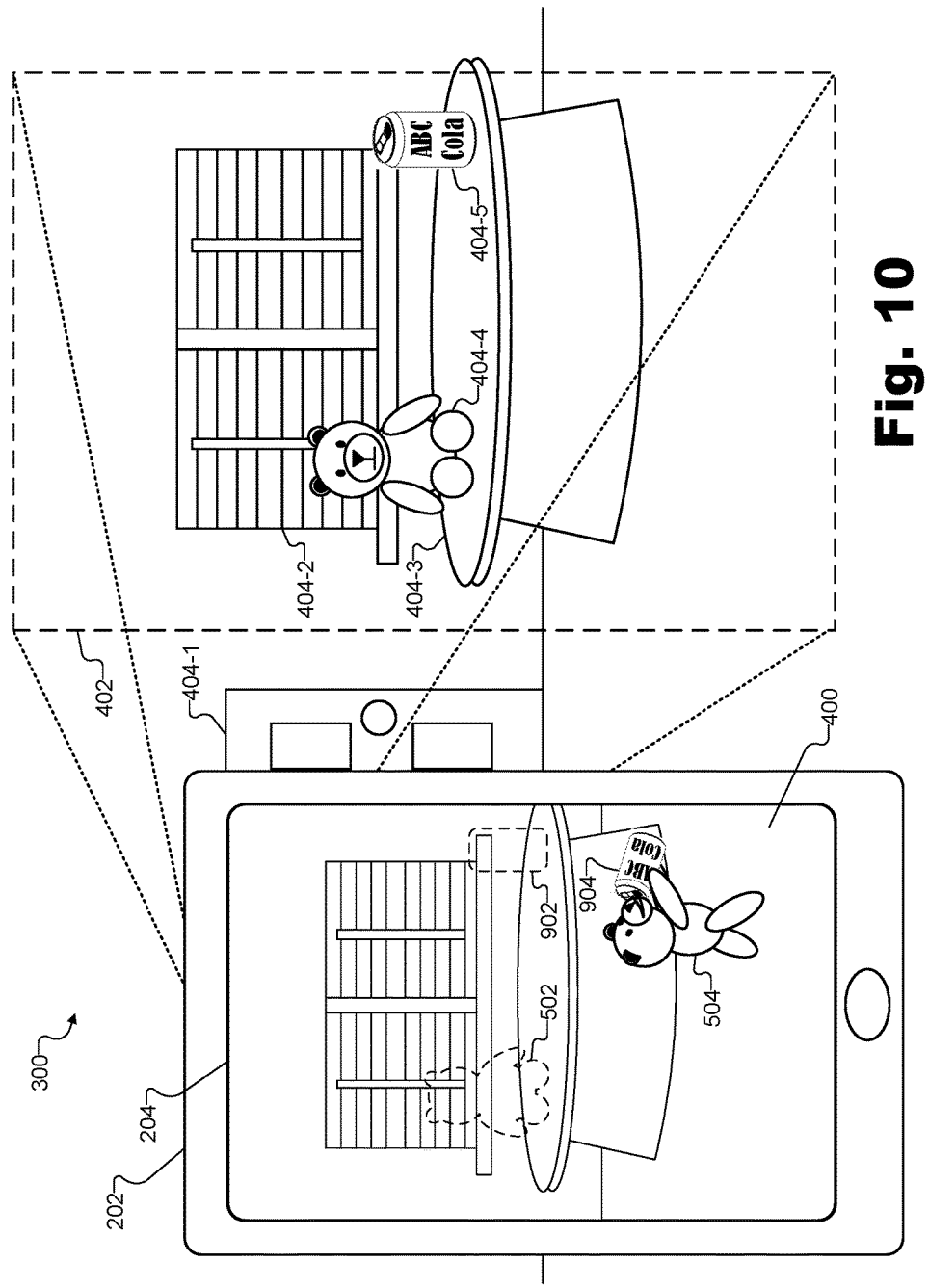
FIG. 10 illustrates another exemplary view of the mixed reality presentation of FIG. 4 according to principles described herein.

FIG. 10 illustrates mixed reality presentation 400 as virtual object 904 replaces soda can object 404-5 (e.g., as virtual domain 500 shown in FIG. 9 is overlaid on the video data of real-world environment 300 being captured and accessed). As shown, while teddy bear object 404-4 and soda can object 404-5 remain stationary atop table object 404-3 in real-world environment 300, both of these objects may be shown to have moved and to interact with one another in mixed reality presentation 400.

In some examples, mixed reality presentation 400 may be so immersive and may appear so realistic that a user to whom mixed reality presentation 400 is presented may lose track of which objects presented within mixed reality presentation 400 are real and which objects have been virtualized. For example, if the animated character of virtual object 504 discards the soda can of virtual object 904 after appearing to drink it and then walks away, the user may lose track of the fact that teddy bear object 404-4 and soda can object 404-5 remain at the same position on the table as they have always been in reality. As such, system 100 may be configured to provide warnings and/or reminders of where real objects are in order to prevent accidents or undesirable confusion and disorientation as the user interacts with objects within real-world environment 300. For example, if the user approaches that actual location of soda can object 404-5 on the table after the object has been extracted from mixed reality presentation 400, system 100 may beep, flash an actual video image of soda can object 404-5, temporarily remove extraction object 902 from virtual domain 500 to reveal soda can object 404-5, or otherwise remind the user of the presence of the soda can so that the user does not accidentally knock it over or the like.

In the extended example illustrated by the figures above, a real object associated with a character (i.e., teddy bear object 404-4) has been shown to be virtualized so as to appear to come to life. While a real object associated with a character being made to come to life provides a good example of how the principles described herein may be applied, it will be understood that this scenario is exemplary only, and that the same principles described above may be applied in various ways to various other types of scenarios. For example, the same principles described herein may be applicable to other types of objects that are not physical objects such as images of 2D characters printed on magazines, t-shirts, etc., images presented on screens such as television screens, and so forth. For instance, a character printed on a magazine or t-shirt may be made to come to life and to climb out of the magazine page or out of the t-shirt to then perform behaviors similar to the animated character described above (e.g., spotting and causing other objects to be virtualized, interacting with other virtualized objects, etc.).

Additionally, in some examples, the extracting of a target object from a mixed reality presentation may be performed by extracting a first part and a second part of the target object from the mixed reality presentation, while the second virtual object that replaces the extracted first and second parts of the target object within the mixed reality presentation may implement a representation of only the first part of the target object (i.e., and not the second part of the target object).

Figure 11:
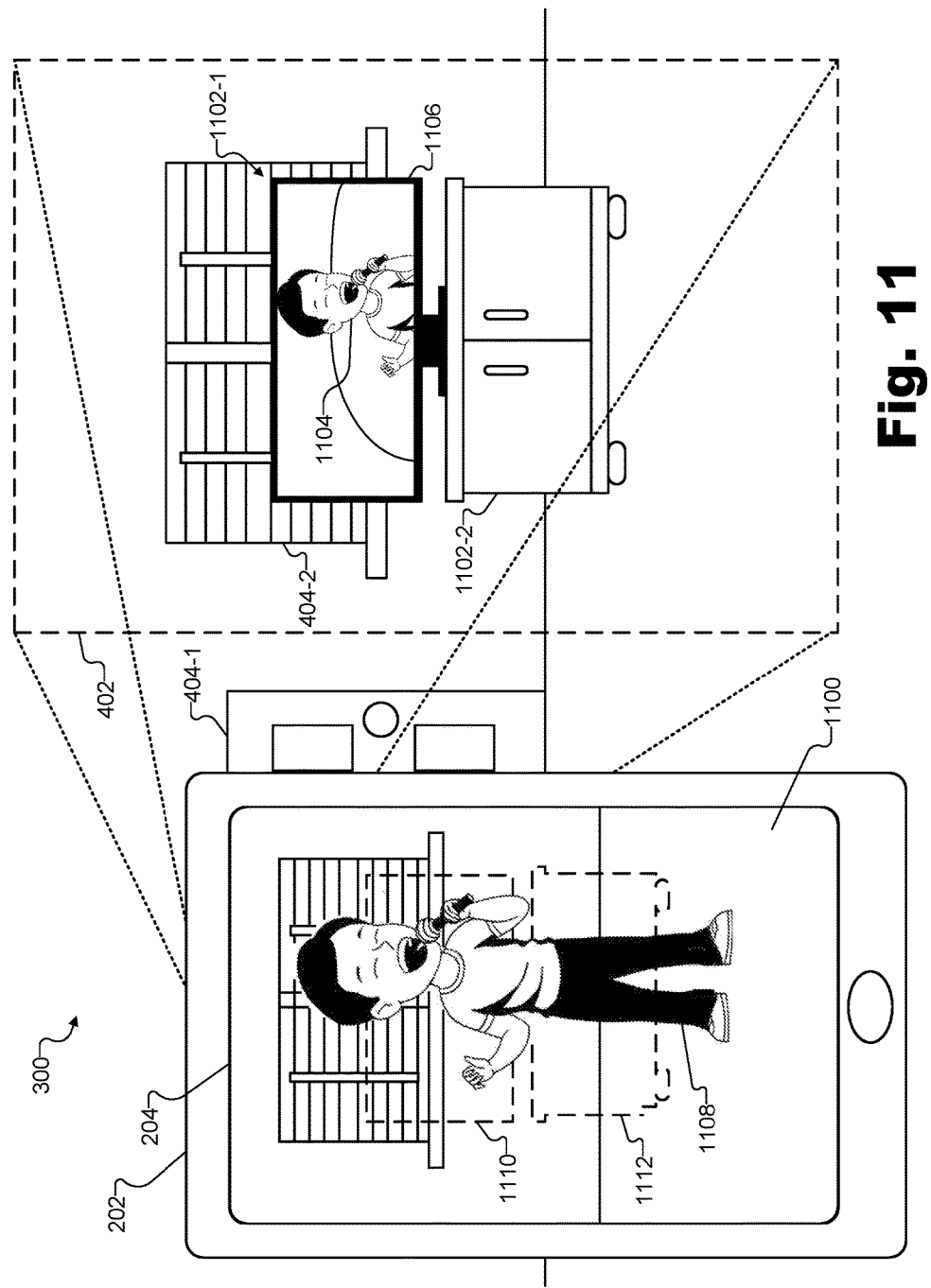
FIG. 11 illustrates another exemplary mixed reality presentation being presented to the user of a mixed reality player device according to principles described herein.

For instance, FIG. 11 illustrates another exemplary mixed reality presentation 1100 being presented to user 302 of mixed reality player device 202 while user 302 and mixed reality player device 202 are located within real-world environment 300. As shown, FIG. 11 illustrates some of the same objects within real-world environment 300 as previously described and illustrated such as door object 404-1 and window blinds object 404-2. Additionally, FIG. 11 illustrates certain additional real objects 1102 within real-world environment 300 that were not previously shown. For example, FIG. 11 illustrates a television object 1102-1 and a furniture object 1102-2 upon which television object 1102-1 is disposed.

As shown, television object 1102-1 may include two separate parts 1104 and 1106. Specifically, part 1104 of television object 1102-1 may include an image being displayed on a screen of television object 1102-1. More particularly, part 1104 may include a portion of the image associated with a character (e.g., a singer on a television program in the example illustrated). Part 1106 may include other portions of the screen image that are not associated with (e.g., not representative of) the character, a bezel around the screen, and/or other components of the television object 1102-1 (e.g., such as the stand, etc.). Accordingly, as shown, system 100 may present a virtual object 1108 associated with the singer character (e.g., an animated 3D model of the singer character based on part 1104 of television object 1102-1) within mixed reality presentation 1100 as a replacement for television object 1102-1. More particularly, an extraction object 1110 may be presented within mixed reality presentation 1100 to extract both parts 1104 and 1106 of television object 1102-1 while replacement virtual object 1108 may be a representation of only part 1104. Additionally, as shown, an extraction object 1112 may be presented within mixed reality presentation 1100 to extract furniture object 1102-2. In this example, furniture object 1102-2 may not be associated with a replacement virtual object within mixed reality presentation 1100 representative of furniture object 1102-2. However, as shown, the 3D model of the singer character implemented as virtual object 1108 may be generated so as to include more of the singer character than is shown by part 1104 of television object 1102-1 (e.g., the lower half of the singer character including the character's legs and feet), and these portions may stand in for at least a portion of extraction object 1112.

Accordingly, as shown, mixed reality presentation 1100 may provide the user a mixed reality experience in which the singer character appears to give a private performance within real-world environment 300 rather than a performance on television object 1102-1. In some examples, the performance given by virtual object 1108 may be identical to the performance given on television, while, in other examples, system 100 may cause virtual object 1108 to deviate from the television performance in certain ways. For example, the singer may perform certain songs within mixed reality presentation 400 that are favorites of user 302 in place of certain songs actually performed by the singer on television in real-world environment 300.

Figure 12:
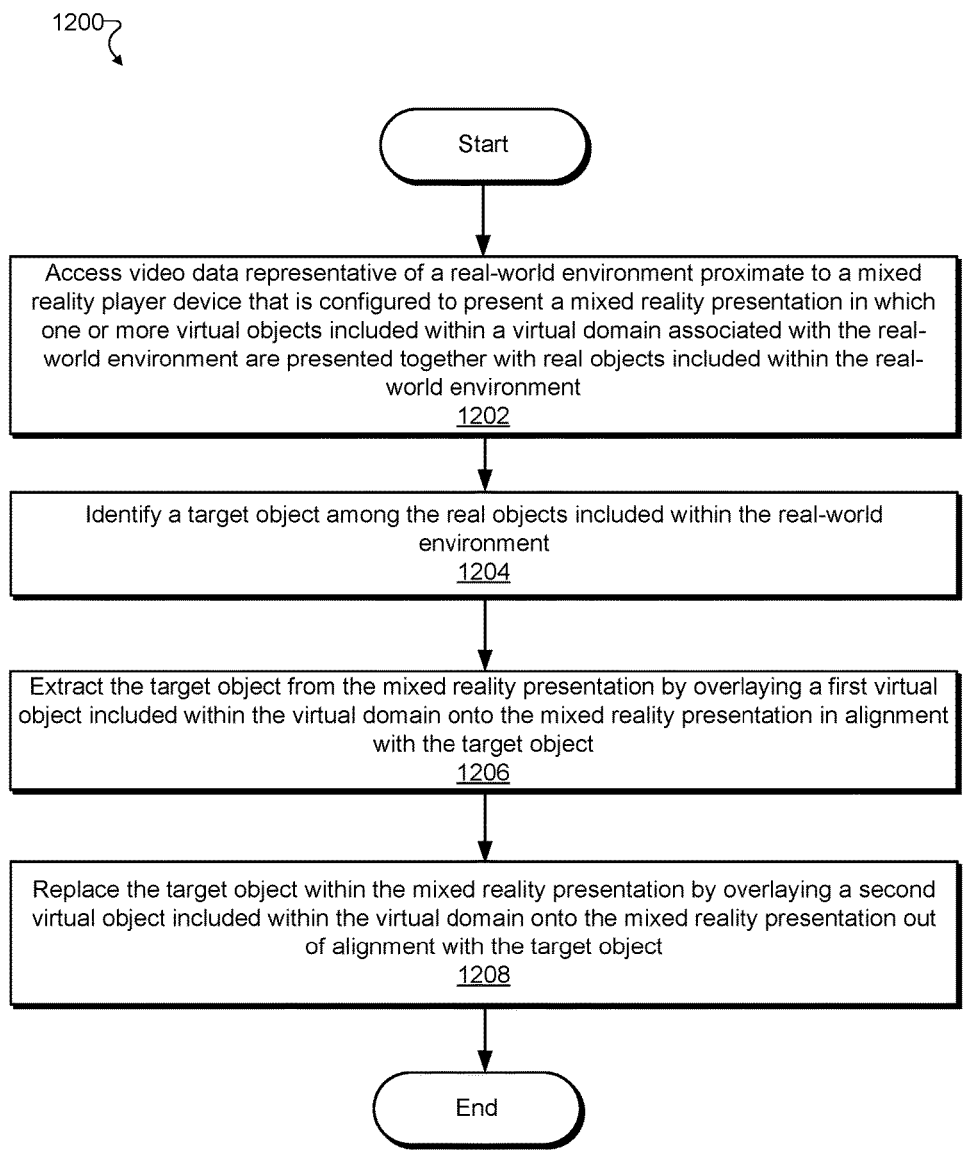
FIG. 12 illustrates an exemplary method for virtualizing a target object within a mixed reality presentation according to principles described herein.

FIG. 12 illustrates an exemplary method 1200 for virtualizing a target object within a mixed reality presentation according to principles described herein. While FIG. 12 illustrates exemplary operations according to one embodiment, other embodiments may omit, add to, reorder, and/or modify any of the operations shown in FIG. 12. One or more of the operations shown in FIG. 12 may be performed by a mixed reality presentation system such as system 100, any components included therein, and/or any implementation thereof.

In operation 1202, a mixed reality presentation system may access video data representative of a real-world environment. For example, the real-world environment may be proximate to a mixed reality player device that is configured to present, to a user of the mixed reality player device, a mixed reality presentation. In some examples, the mixed reality presentation may include one or more virtual objects that are included within a virtual domain associated with the real-world environment and that are presented together with real objects included within the real-world environment. Operation 1202 may be performed in any of the ways described herein.

In operation 1204, the mixed reality presentation system may identify a target object among the real objects included within the real-world environment. For example, the mixed reality presentation system may identify the target object based on the video data accessed in operation 1202. Operation 1204 may be performed in any of the ways described herein.

In operation 1206, the mixed reality presentation system may extract the target object identified in operation 1204 from the mixed reality presentation presented to the user by the mixed reality player device. For example, the mixed reality presentation system may extract the target object by overlaying a first virtual object included within the virtual domain onto the mixed reality presentation in alignment with the target object. The first virtual object may implement, for instance, an extraction object for the target object. Operation 1206 may be performed in any of the ways described herein.

In operation 1208, the mixed reality presentation system may replace the target object within the mixed reality presentation. Specifically, for instance, the mixed reality presentation system may replace the target object by overlaying a second virtual object onto the mixed reality presentation out of alignment with the target object. The virtual object may be included within the virtual domain and may implement a representation of the target object. Operation 1208 may be performed in any of the ways described herein.

Figure 13:
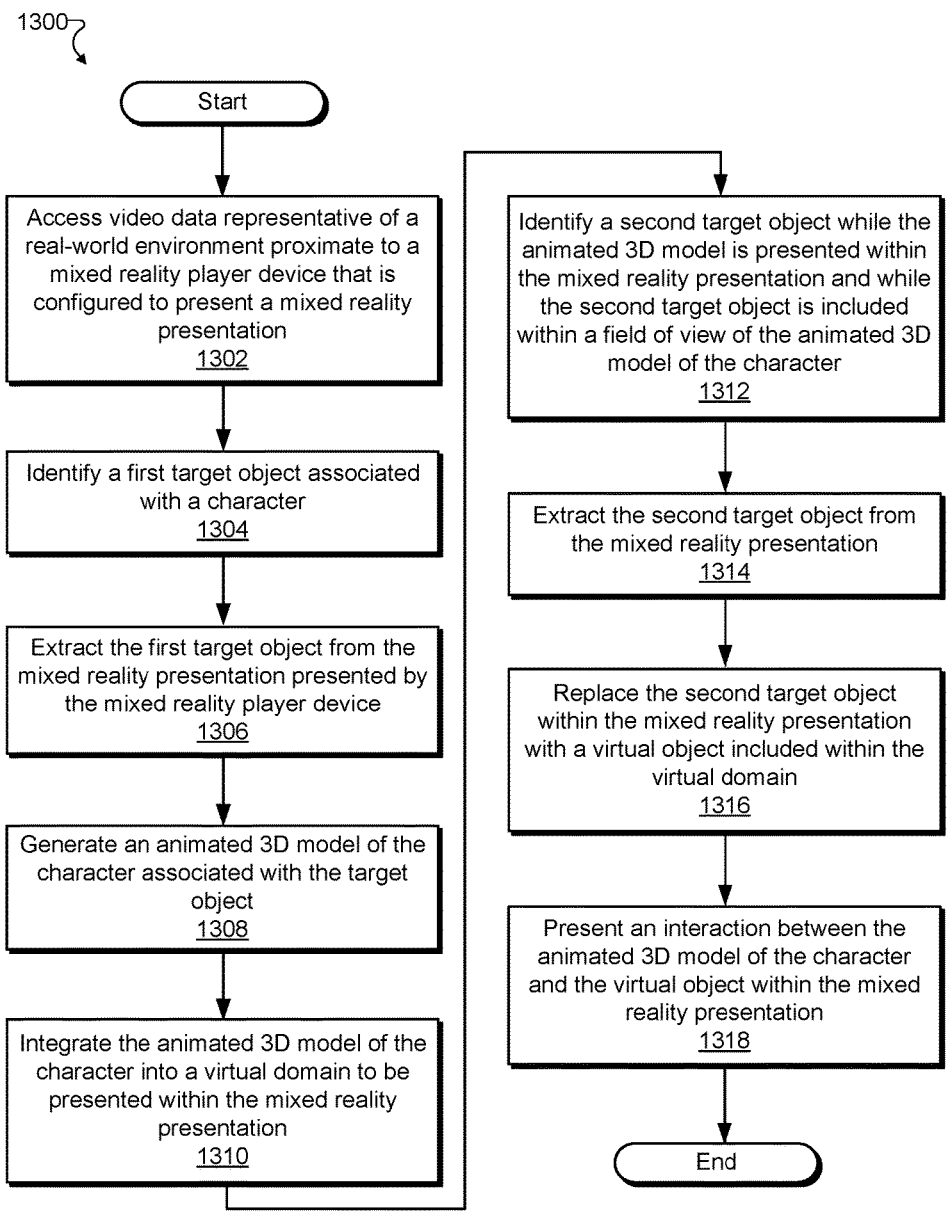
FIG. 13 illustrates another exemplary method for virtualizing a target object within a mixed reality presentation according to principles described herein.

FIG. 13 illustrates an exemplary method 1300 for virtualizing a target object within a mixed reality presentation according to principles described herein. While FIG. 13 illustrates exemplary operations according to one embodiment, other embodiments may omit, add to, reorder, and/or modify any of the operations shown in FIG. 13. One or more of the operations shown in FIG. 13 may be performed by a mixed reality presentation system such as system 100, any components included therein, and/or any implementation thereof.

In operation 1302, a mixed reality presentation system may access video data representative of a real-world environment. For example, the real-world environment may be proximate to a mixed reality player device that is configured to present, to a user of the mixed reality player device, a mixed reality presentation. In some examples, the mixed reality presentation may include one or more virtual objects that are included within a virtual domain associated with the real-world environment and that are presented together with real objects included within the real-world environment. Operation 1302 may be performed in any of the ways described herein.

In operation 1304, the mixed reality presentation system may identify a target object among the real objects included within the real-world environment. For example, the mixed reality presentation system may identify the target object based on the accessed video data, and the target object may emulate a character. Operation 1304 may be performed in any of the ways described herein.

In operation 1306, the mixed reality presentation system may extract the target object identified in operation 1304 from the mixed reality presentation presented to the user by the mixed reality player device. For example, the mixed reality presentation system may extract the target object by overlaying a first virtual object included within the virtual domain onto the mixed reality presentation in alignment with the target object. The first virtual object may implement, for instance, an extraction object for the target object. Operation 1306 may be performed in any of the ways described herein.

In operation 1308, the mixed reality presentation system may generate a second virtual object implemented as an animated 3D model of the character emulated by the target object identified in operation 1304. Operation 1308 may be performed in any of the ways described herein.

In operation 1310, the mixed reality presentation system may integrate the animated 3D model of the character generated in operation 1308 into the virtual domain to be presented within the mixed reality presentation. Operation 1310 may be performed in any of the ways described herein.

In operation 1312, the mixed reality presentation system may identify an additional target object among the real objects included within the real-world environment. For example, the mixed reality presentation system may identify the additional target object while the animated 3D model is presented within the mixed reality presentation and while the additional target object is included within a field of view of the animated 3D model of the character. Operation 1312 may be performed in any of the ways described herein.

In operation 1314, the mixed reality presentation system may extract the additional target object identified in operation 1312 from the mixed reality presentation. For example, the mixed reality presentation system may extract the additional target object by overlaying a third virtual object included within the virtual domain onto the mixed reality presentation in alignment with the additional target object. The third virtual object may implement, for instance, an extraction object for the additional target object. Operation 1314 may be performed in any of the ways described herein.

In operation 1316, the mixed reality presentation system may replace the additional target object extracted in operation 1314 within the mixed reality presentation. Specifically, the mixed reality presentation system may replace the additional target object by overlaying a fourth virtual object included within the virtual domain onto the mixed reality presentation out of alignment with the additional target object. Operation 1316 may be performed in any of the ways described herein.

In operation 1318, the mixed reality presentation system may present, within the mixed reality presentation, an interaction between the animated 3D model of the character and the fourth virtual object. Operation 1318 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 14:
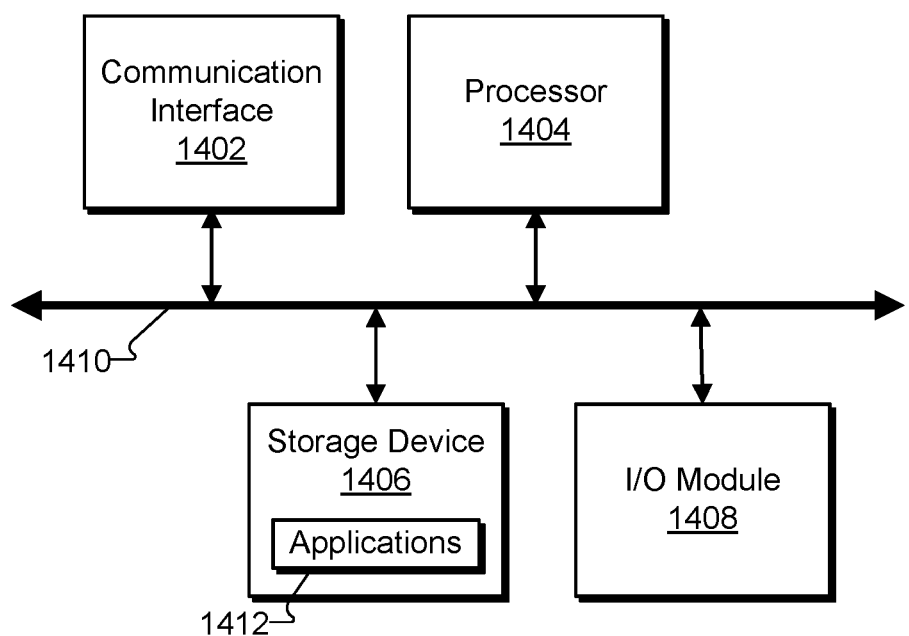
FIG. 14 illustrates an exemplary computing device according to principles described herein.

FIG. 14 illustrates an exemplary computing device 1400 that may be specifically configured to perform one or more of the processes described herein. As shown in FIG. 14, computing device 1400 may include a communication interface 1402, a processor 1404, a storage device 1406, and an input/output ("I/O") module 1408 communicatively connected via a communication infrastructure 1410. While an exemplary computing device 1400 is shown in FIG. 14, the components illustrated in FIG. 14 are not intended to be limiting. Additional or alternative components may be used in other embodiments. Components of computing device 1400 shown in FIG. 14 will now be described in additional detail.

Communication interface 1402 may be configured to communicate with one or more computing devices. Examples of communication interface 1402 include, without limitation, a wired network interface (such as a network interface card), a wireless network interface (such as a wireless network interface card), a modem, an audio/video connection, and any other suitable interface.

Processor 1404 generally represents any type or form of processing unit capable of processing data or interpreting, executing, and/or directing execution of one or more of the instructions, processes, and/or operations described herein. Processor 1404 may direct execution of operations in accordance with one or more applications 1412 or other computer-executable instructions such as may be stored in storage device 1406 or another computer-readable medium.

Storage device 1406 may include one or more data storage media, devices, or configurations and may employ any type, form, and combination of data storage media and/or device. For example, storage device 1406 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1406. For example, data representative of one or more executable applications 1412 configured to direct processor 1404 to perform any of the operations described herein may be stored within storage device 1406. In some examples, data may be arranged in one or more databases residing within storage device 1406.

I/O module 1408 may include one or more I/O modules configured to receive user input and provide user output. One or more I/O modules may be used to receive input for a single virtual reality experience. I/O module 1408 may include any hardware, firmware, software, or combination thereof supportive of input and output capabilities. For example, I/O module 1408 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1408 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1400. For example, one or more applications 1412 residing within storage device 1406 may be configured to direct processor 1404 to perform one or more processes or functions associated facilities 102 through 106 of system 100. Likewise, storage facility 108 of system 100 may be implemented by storage device 1406 or a component thereof.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   accessing, by a mixed reality presentation system, video data representative of a real-world environment proximate to a mixed reality player device that is configured to present, to a user of the mixed reality player device, a mixed reality presentation in which one or more virtual objects included within a virtual domain associated with the real-world environment are presented together with real objects included within the real-world environment;
   identifying, by the mixed reality presentation system based on the accessed video data, a target object among the real objects included within the real-world environment, the target object casting a shadow upon one or more of the real objects included within the real-world environment;
   extracting, by the mixed reality presentation system, the target object from the mixed reality presentation by overlaying a first virtual object included within the virtual domain onto the mixed reality presentation in alignment with the target object, the first virtual object implementing an extraction object for the target object, and
   overlaying a shadow extraction object onto the one or more real objects upon which the shadow is cast in order to remove the shadow within the mixed reality presentation; and
   replacing, by the mixed reality presentation system, the target object within the mixed reality presentation by overlaying a second virtual object included within the virtual domain onto the mixed reality presentation out of alignment with the target object, the second virtual object implementing a representation of the target object.

2. The method of claim 1, wherein the second virtual object that replaces the target object within the mixed reality presentation implements an animated representation of the target object that appears to move, within the mixed reality presentation and over a period of time, from a first location coincident with a location of the target object within the real-world environment to a second location distinct from the location of the target object within the real-world environment.

3. The method of claim 1, wherein:
   the extracting of the target object from the mixed reality presentation is performed by extracting a first part and a second part of the target object from the mixed reality presentation; and
   the second virtual object that replaces the extracted first and second parts of the target object within the mixed reality presentation implements a representation of only the first part of the target object and not the second part of the target object.

4. The method of claim 1, wherein the overlaying of the first virtual object onto the mixed reality presentation in alignment with the target object includes:
   identifying an occluded area of the real-world environment that is not represented in the accessed video data due to being occluded from view, from a vantage point of a device capturing the accessed video data, by the target object;
   determining that the occluded area is not occluded from view, within the mixed reality presentation from a vantage point of the user, by the second virtual object that replaces the target object;
   generating the first virtual object to include an extrapolation of video data representative of the occluded area based on a representation within the accessed video data of one or more real objects associated with the occluded area; and
   overlaying the first virtual object onto the occluded area within the mixed reality presentation.

5. The method of claim 4, wherein:
   the overlaying of the first virtual object onto the mixed reality presentation in alignment with the target object further includes accessing data representative of one or more non-occluded images of the one or more real objects associated with the occluded area; and
   the generating of the first virtual object to include the extrapolation of the video data representative of the occluded area is performed based on the one or more non-occluded images of the one or more real objects associated with the occluded area.

6. The method of claim 1, further comprising:
   identifying, by the mixed reality presentation system based on the accessed video data, a light source that illuminates the target object within the real-world environment;

determining, by the mixed reality presentation system based on the identified light source, a characteristic of the light source; and simulating, by the mixed reality presentation system and based on the determined characteristic of the light source, the identified light source within the virtual domain of the mixed reality presentation, wherein the simulating of the identified light source within the virtual domain includes the overlaying of the shadow extraction object onto the one or more real objects upon which the shadow is cast.

7. The method of claim 6, wherein the simulating of the identified light source within the virtual domain further includes simulating an effect of the light source on the second virtual object that replaces the target object within the mixed reality presentation.

8. The method of claim 6, wherein the simulating of the identified light source within the virtual domain further includes simulating an effect of the light source on an extrapolated area of the real-world environment that is presented, within the mixed reality presentation, in place of an area of the real-world environment that is occluded from view by the target object and not by the second virtual object that replaces the target object.

9. The method of claim 6, wherein the overlaying of the shadow extraction object onto the one or more real objects upon which the shadow is cast is performed by simulating an effect of the light source on an area of the real-world environment that is affected, with respect to lighting, by the extracting of the target object.

10. The method of claim 1, wherein the overlaying of the second virtual object onto the mixed reality presentation out of alignment with the target object includes:

generating a three-dimensional ("3D") model of the target object to be the second virtual object implementing the representation of the target object;

integrating the 3D model of the target object into the virtual domain of the mixed reality presentation; and manipulating the 3D model of the target object to behave differently, within the virtual domain of the mixed reality presentation, than the target object behaves within the real-world environment.

11. The method of claim 10, wherein the manipulating of the 3D model of the target object to behave differently than the target object is performed based on at least one of:

a user command from the user to direct the 3D model to behave in a particular manner that is different from how the target object behaves within the real-world environment; and artificial intelligence associated with the 3D model and configured to cause the 3D model to automatically behave in the particular manner without the user command.

12. The method of claim 1, wherein:

the second virtual object that replaces the target object within the mixed reality presentation is an animated character; and the method further comprises identifying, by the mixed reality presentation system, an additional target object among the real objects included within the real-world environment while the animated character is presented within the mixed reality presentation and while the additional target object is included within a field of view of the animated character, extracting, by the mixed reality presentation system, the additional target object from the mixed reality presentation by overlaying a third virtual object included within the virtual domain onto the mixed reality presentation in alignment with the additional target object, the third virtual object implementing an extraction object for the additional target object, replacing, by the mixed reality presentation system, the additional target object within the mixed reality presentation by overlaying a fourth virtual object included within the virtual domain onto the mixed reality presentation out of alignment with the additional target object, and presenting, by the mixed reality presentation system within the mixed reality presentation, an interaction between the animated character and the fourth virtual object.

13. The method of claim 1, embodied as computer-executable instructions on at least one non-transitory computer-readable medium.

14. A method comprising:

accessing, by a mixed reality presentation system, video data representative of a real-world environment proximate to a mixed reality player device that is configured to present, to a user of the mixed reality player device, a mixed reality presentation in which one or more virtual objects included within a virtual domain associated with the real-world environment are presented together with real objects included within the real-world environment;

identifying, by the mixed reality presentation system based on the accessed video data, a target object among the real objects included within the real-world environment, the target object emulating a character and casting a shadow upon one or more of the real object included within the real-world environment;

extracting, by the mixed reality presentation system, the target object from the mixed reality presentation by overlaying a first virtual object included within the virtual domain onto the mixed reality presentation in alignment with the target object, the first virtual object implementing an extraction object for the target object, and overlaying a shadow extraction object onto the one or more real objects upon which the shadow is cast in order to remove the shadow within the mixed reality presentation;

generating, by the mixed reality presentation system, a second virtual object implemented as an animated three-dimensional ("3D") model of the character emulated by the target object;

integrating, by the mixed reality presentation system, the animated 3D model of the character into the virtual domain to be presented within the mixed reality presentation;

identifying, by the mixed reality presentation system, an additional target object among the real objects included within the real-world environment while the animated 3D model is presented within the mixed reality presentation and while the additional target object is included within a field of view of the animated 3D model of the character;

extracting, by the mixed reality presentation system, the additional target object from the mixed reality presentation by overlaying a third virtual object included within the virtual domain onto the mixed reality presentation in alignment with the additional target object, the third virtual object implementing an extraction object for the additional target object;

replacing, by the mixed reality presentation system, the additional target object within the mixed reality presentation by overlaying a fourth virtual object included within the virtual domain onto the mixed reality presentation out of alignment with the additional target object; and presenting, by the mixed reality presentation system within the mixed reality presentation, an interaction between the animated 3D model of the character and the fourth virtual object.

15. The method of claim 14, embodied as computer-executable instructions on at least one non-transitory computer-readable medium.

16. A system comprising:
at least one physical computing device that
  accesses video data representative of a real-world environment proximate to a mixed reality player device that is configured to present, to a user of the mixed reality player device, a mixed reality presentation in which one or more virtual objects included within a virtual domain associated with the real-world environment are presented together with real objects included within the real-world environment;
  identifies, based on the accessed video data, a target object among the real objects included within the real-world environment, the target object casting a shadow upon one or more of the real objects included within the real-world environment;
  extracts the target object from the mixed reality presentation by
    overlaying a first virtual object included within the virtual domain onto the mixed reality presentation in alignment with the target object, the first virtual object implementing an extraction object for the target object, and
    overlaying a shadow extraction object onto the one or more real objects upon which the shadow is cast in order to remove the shadow within the mixed reality presentation; and
  replaces the target object within the mixed reality presentation by overlaying a second virtual object included within the virtual domain onto the mixed reality presentation out of alignment with the target object, the second virtual object implementing a representation of the extracted target object.

17. The system of claim 16, wherein the second virtual object that replaces the target object within the mixed reality presentation implements an animated representation of the target object that appears to move, within the mixed reality presentation and over a period of time, from a first location coincident with a location of the target object within the real-world environment to a second location distinct from the location of the target object within the real-world environment.

18. The system of claim 16, wherein the at least one physical computing device overlays the first virtual object onto the mixed reality presentation in alignment with the target object by:

identifying an occluded area of the real-world environment that is not represented in the accessed video data due to being occluded from view, from a vantage point of a device capturing the accessed video data, by the target object;

determining that the occluded area is not occluded from view, within the mixed reality presentation from a vantage point of the user, by the second virtual object that replaces the target object;

generating the first virtual object to include an extrapolation of video data representative of the occluded area based on a representation within the accessed video data of one or more real objects associated with the occluded area; and overlaying the first virtual object onto the occluded area within the mixed reality presentation.

19. The system of claim 16, wherein:
the at least one physical computing device further:
  identifies, based on the accessed video data, a light source that illuminates the target object within the real-world environment;
  determines, based on the identified light source, a characteristic of the light source; and
  simulates, based on the determined characteristic of the light source, the identified light source within the virtual domain of the mixed reality presentation; and
the simulation of the identified light source within the virtual domain includes the overlaying of the shadow extraction object onto the one or more real objects upon which the shadow is cast.

20. The system of claim 16, wherein:
the second virtual object that replaces the target object within the mixed reality presentation is an animated character; and
the at least one physical computing device further
  identifies an additional target object among the real objects included within the real-world environment while the animated character is presented within the mixed reality presentation and while the additional target object is included within a field of view of the animated character,
  extracts the additional target object from the mixed reality presentation by overlaying a third virtual object included within the virtual domain onto the mixed reality presentation in alignment with the additional target object, the third virtual object implementing an extraction object for the additional target object,
  replaces the additional target object within the mixed reality presentation by overlaying a fourth virtual object included within the virtual domain onto the mixed reality presentation out of alignment with the additional target object, and
  presents, within the mixed reality presentation, an interaction between the animated character and the fourth virtual object.

* * * * *